(12) United States Patent
Tanaka et al.

(10) Patent No.: US 7,799,732 B2
(45) Date of Patent: *Sep. 21, 2010

(54) HIGHLY ACTIVE PHOTOCATALYST PARTICLES, METHOD OF PRODUCTION THEREFOR, AND USE THEREOF

(75) Inventors: Jun Tanaka, Tokyo (JP); Masayuki Sanbayashi, Toyama (JP); Yoshinori Ueyoshi, Toyama (JP); Hiroyuki Hagihara, Nagoya (JP)

(73) Assignee: Showa Denko K.K., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/142,472

(22) Filed: Jun. 19, 2008

(65) Prior Publication Data
US 2009/0082196 A1    Mar. 26, 2009

Related U.S. Application Data

(60) Division of application No. 10/443,045, filed on May 22, 2003, now Pat. No. 7,414,009, which is a continuation-in-part of application No. 10/322,787, filed on Dec. 19, 2002, now Pat. No. 7,378,371, and a continuation-in-part of application No. PCT/JP02/13403, filed on Dec. 20, 2002.

(60) Provisional application No. 60/392,970, filed on Jul. 2, 2002.

(30) Foreign Application Priority Data

| Dec. 21, 2001 | (JP) | 2001-388615 |
| Dec. 25, 2001 | (JP) | 2001-390736 |
| Jun. 27, 2002 | (JP) | 2002-188131 |

(51) Int. Cl.
| B01J 23/00 | (2006.01) |
| B01J 21/00 | (2006.01) |
| B01J 20/00 | (2006.01) |
| B01J 29/00 | (2006.01) |
| B01J 37/00 | (2006.01) |

(52) U.S. Cl. ........... 502/350; 502/170; 502/200; 502/202; 502/208; 502/217; 502/242; 502/338; 502/340; 502/344; 502/343; 502/349; 502/351; 502/439

(58) Field of Classification Search ........... 502/242, 502/249, 350, 351, 439, 170, 200, 202, 208, 502/217, 338, 340, 343, 344, 349
See application file for complete search history.

(56) References Cited

U.S. PATENT DOCUMENTS 3,608,836 A    9/1971    Bryant et al.
(Continued)

FOREIGN PATENT DOCUMENTS

EP    0 963 789 A2    12/1999
(Continued)

*Primary Examiner*—Cam N Nguyen
(74) *Attorney, Agent, or Firm*—Sughrue Mion, PLLC

(57) ABSTRACT

A method of producing composite particles of titanium dioxide and a compound inactive as a photocatalyst, comprising the steps of preparing a water based slurry of pH 3 to 5 comprising titanium dioxide, preparing a water based solution comprising a compound inactive as a photocatalyst, and reacting the slurry and the water based solution together at a pH within a range from 4 to 10 is provided, together with highly active photocatalyst particles produced using such a method, and potential uses of such photocatalyst particles.

18 Claims, 2 Drawing Sheets

U.S. PATENT DOCUMENTS

| | | |
|---|---|---|
| 3,898,321 A | 8/1975 | Marsh |
| 4,240,933 A | 12/1980 | Copelin |
| 4,520,124 A | 5/1985 | Abe et al. |
| 4,547,487 A | 10/1985 | Vogel et al. |
| 4,944,936 A | 7/1990 | Lawhorne |
| 5,718,878 A | 2/1998 | Zhang |
| 5,759,948 A | 6/1998 | Takaoka et al. |
| 5,981,425 A | 11/1999 | Taoda et al. |
| 6,090,736 A | 7/2000 | Taoda et al. |
| 6,180,548 B1 | 1/2001 | Taoda et al. |
| 6,228,480 B1 | 5/2001 | Kimura et al. |
| 6,277,346 B1 | 8/2001 | Murasawa et al. |
| 6,383,980 B1 | 5/2002 | Hagihara et al. |
| 6,420,437 B1 | 7/2002 | Mori et al. |
| 6,544,493 B1 | 4/2003 | Tanaka et al. |
| 6,548,169 B2 | 4/2003 | Tanaka et al. |
| 6,572,964 B2 | 6/2003 | Tanaka et al. |
| 6,576,052 B1 | 6/2003 | Takahashi et al. |
| 6,576,589 B1 | 6/2003 | Na et al. |
| 6,683,023 B2 | 1/2004 | Ito et al. |
| 6,828,273 B2 | 12/2004 | Tanaka et al. |
| 6,887,816 B2 | 5/2005 | Tanaka et al. |
| 7,018,608 B2 | 3/2006 | Tanaka et al. |
| 7,060,643 B2 | 6/2006 | Sanbayashi et al. |
| 2002/0106321 A1 | 8/2002 | Tanaka et al. |
| 2005/0027039 A1 | 2/2005 | Sanbayashi et al. |

FOREIGN PATENT DOCUMENTS

| | | |
|---|---|---|
| EP | 1 064 999 A1 | 1/2001 |
| EP | 1 125 636 A1 | 8/2001 |
| JP | 7-89722 A | 4/1995 |
| JP | 07-257923 A | 10/1995 |
| JP | 9-225319 A | 9/1997 |
| JP | 9-239277 A | 9/1997 |
| JP | 9-262482 A | 10/1997 |
| JP | 10-142008 A | 5/1998 |
| JP | 10-24416 A | 9/1998 |
| JP | 11-267519 A | 10/1999 |
| JP | 11-278843 A | 10/1999 |
| JP | 11-197513 A | 11/1999 |
| JP | 11-309379 A | 11/1999 |
| JP | 11-335121 A | 12/1999 |
| JP | 11-343426 A | 12/1999 |
| JP | 2000-1631 A | 1/2000 |
| JP | 2000-290015 A | 10/2000 |
| JP | 10-244166 A | 1/2001 |
| JP | 2001-72419 A | 3/2001 |
| JP | 2002-1125 A | 1/2002 |
| WO | WO 94/11092 A1 | 5/1994 |
| WO | WO 99/33566 A1 | 7/1999 |
| WO | WO 99/33566 A1 | 8/1999 |
| WO | WO 00/10706 A1 | 3/2000 |

HIGHLY ACTIVE PHOTOCATALYST PARTICLES, METHOD OF PRODUCTION THEREFOR, AND USE THEREOF

CROSS-REFERENCE TO RELATED APPLICATION

This is a divisional of application Ser. No. 10/443,045, filed May 22, 2003, now U.S. Pat. No. 7,414,009, which is a continuation-in-part of application Ser. No. 10/322,787, filed Dec. 19, 2002, now U.S. Pat. No. 7,378,371, which claims the benefit of U.S. Provisional Application No. 60/392,970, filed Jul. 2, 2002, and a continuation-in-part of International Application No. PCT/JP02/13403, filed Dec. 20, 2002.

BACKGROUND OF THE INVENTION

1. Field of the Invention

The present invention relates to a photocatalyst with high photoactivity. More specifically, the present invention relates to photocatalyst particles and powder which are capable of exhibiting good photocatalytic function using a practical light source of extremely low intensity, such as a fluorescent lamp, and also relates to an organic polymer composition, a slurry, a coating agent and a film which displays both photocatalytic properties and hydrophilicity, incorporating such a photocatalyst, and articles using the same.

2. Description of Related Art

Conventionally, titanium oxide has been widely used as a typical, practical photocatalyst. Titanium oxide has the property of absorbing ultraviolet light at wavelengths below approximately 400 nm and producing an excited electron. When the generated electron and hole reach the particle surface, combinations with oxygen and water and the like generate a variety of different radicals. These radicals typically cause an oxidizing action, and oxidize and decompose substances adsorbed to the surface thereof. This is the basic principle of photocatalysis. The use of the optical functions of ultra fine particles of titanium oxide in antibacterial, deodorizing and stainproofing applications, and in environmental clean-up applications such as atmospheric purification and water quality purification are currently under investigation.

Examples of methods for maximizing catalytic function include the methods described below.

A method for, (1) reducing the particle size (This method is extremely effective in suppressing the recombination of the generated electron and hole.);

(2) increasing the crystallinity (This method is effective in raising the speed with which the generated electron and hole diffuse towards the surface.);

(3) performing charge separation (This method involves charge separation of the generated electron and hole, to increase the yield of electrons and holes which reach the surface.); and (4) adjusting of the band gap.

If the band gap is reduced (and the maximum wavelength of absorption is increased) by the addition of a minute quantity of an impurity, then the efficiency of light sources emitting little ultraviolet light, such as the sun and fluorescent lamps, can be improved.

Of these methods, in recent years, the investigation of so-called visible light responsive photocatalysts, aimed the method (4) above, has attracted considerable interest.

For example in Japanese Unexamined Patent Application, Laid-open No. Hei 9-262482, the maximum wavelength of light absorption for titanium dioxide was shifted to a longer wavelength by modification of an anatase titanium dioxide with high catalytic activity through ion injection of metal elements such as Cr (chromium) or V (vanadium), thereby producing a titanium dioxide capable of catalytic action under visible light irradiation. However, this type of ion injection of metal atoms requires a large apparatus and is expensive, meaning that the industrial practicality is limited.

In addition, Japanese Unexamined Patent Application, Laid-open No. 2001-72419 discloses a titanium oxide with an index X=B/A of no more than 0.97, wherein A represents the average of the half-width of the titanium peak at the first and second measurements among four measurements of the half-width of a titanium peak of titanium oxide with a bond energy within a range from 458 eV to 460 eV as measured by X-ray photoelectron spectroscopy, and B represents the average of the half-width of the titanium peak at the third and fourth measurements. However, not only is the activity of the powder unsatisfactory, but the powder is also colored, meaning that the potential applications of the powder are limited. In a practical sense, the powder also has other drawbacks, such as being unsuitable as a coating in which transparency is required.

Furthermore, many of the conventional visible light responsive photocatalysts require the use of a powerful light source such as a xenon lamp in order to ensure an adequate catalytic function, which, needless to say, reduces their practicality. A photocatalyst capable of exhibiting an adequate effect with a low cost light-source, for example, a typical indoor light source such as a day white fluorescent lamp, would have considerable merit.

International Patent Application, No. WO94/11092 discloses a method of treating bacteria and malodorous substances by applying a photocatalytic thin film formed from a semiconductor such as titanium dioxide on the internal walls of a hospital ward or living spaces, although no mention is made of the method of producing activity within the titanium dioxide, nor of the photocatalytic activity of the particles. If normal titanium dioxide is used, then it is envisaged that the activity achieved using a light source with a very low proportion of ultraviolet light such as a fluorescent lamp would be even lower than that achievable using the visible light responsive photocatalyst described above.

Furthermore, a representative example of applications focusing on the photocatalytic function of fine particles of titanium oxide include methods of kneading fine particles of titanium oxide into a substrate such as an easy handling fiber or plastic molded product, or methods of applying fine particles of titanium oxide to a substrate such as cloth or paper. However, the powerful photocatalytic action of titanium oxide causes the decomposition not only of harmful organic materials and environmental pollutants, but also of the fiber, plastic or paper medium itself, meaning these types of medium are prone to deterioration and are unable to present a practical degree of durability. In addition, because of the ease of handling offered by fine particles of titanium oxide, paints comprising a mixture of fine particles of titanium oxide with a binder are being developed, but a durable and low cost binder capable of overcoming the above deleterious effects on the medium has yet to be found.

Japanese Unexamined Patent Application, Laid-open No. Hei 9-225319 and Japanese Unexamined Patent Application, Laid-open No. Hei 9-239277 disclose measures for suppressing or preventing the deterioration of a resin medium or a binder resulting from the powerful photocatalytic action of titanium oxide, and propose methods in which a photo-inactive compound, which comprises aluminum, silicon or zirconium, is supported on the surface of particles of titanium oxide in the form of islands with steric hindrance, thereby suppressing the photocatalytic action of the titanium oxide. However, although this method results in the supporting of islands of a photo-inactive compound on the photocatalyst, specific regions of the resin medium or binder are still exposed to the powerful photocatalytic action of the titanium oxide.

Japanese Unexamined Patent Application. Laid-open No. Hei 10-244166 proposes a photocatalytic titanium oxide in which the surface of the titanium oxide has been coated with a film of porous calcium phosphate, although in this case, the coating of calcium phosphate causes a reduction in the photocatalytic performance of the catalyst.

International Patent Application, No. WO99/33566 discloses a fine particulate powder of titanium dioxide in which a porous calcium phosphate layer is formed on at least a portion of the surface of the titanium oxide particles, with an anionic surfactant provided at the interface therebetween.

Furthermore, Japanese Unexamined Patent Application, Laid-open No. 2002-1125 discloses a photocatalyst powder comprising fine particles of titanium dioxide containing an anionic active substance such as condensed phosphoric acid, wherein the interfacial potential of the fine particles in a water based environment of pH 5 is within a range from 0 to ~100 mV.

In addition, in terms of slurries comprising titanium oxide with photocatalytic activity, Japanese Unexamined Patent Application, Laid-open No. Hei 11-335121 (Japanese Patent Application No. Hei 10-142008) discloses an anatase titanium oxide containing slurry produced by subjecting a titania sol solution, a titania gel or a titania sol/gel mixture to heat treatment and simultaneous pressure treatment inside a sealed vessel, and subsequently dispersing the product with ultrasonic waves or by mixing.

Furthermore, Japanese Unexamined Patent Application, Laid-open No. Hei 11-343426 discloses a photocatalyst coating with excellent dispersion stability, wherein the photocatalyst coating comprises titanium oxide with a Raman spectrum peak within a range from 146 to 150 $cm^{-1}$ and in which the proportion of anatase titanium oxide is at least 95 mass %, and silica sol, in a solvent.

However, the isoelectric point of the titanium oxide is from 5 to 6, and at pH values close to neutral, namely from pH 5 to 9, the titanium oxide is prone to aggregation, and obtaining a stable, highly transparent dispersion (slurry, sol or the like) in a solvent is difficult. Accordingly, dispersions in the acidic region are typically used, although such dispersions have undesirable effects on living organisms and the environment, and exhibit a corrosive action on metals, which cannot be ignored, making the dispersions unsuitable for use on metal substrates. Consequently, a neutral, stable titanium oxide sol has been keenly sought.

Japanese Unexamined Patent Application, Laid-open No. Hei 11-278843 discloses a titanium oxide sol of pH 5 to 10, comprising 50 to 100 parts by weight of negatively charged titanium oxide colloidal particles component, 5 to 50 parts by weight of a chelating [complexing] agent, and 1 to 50 parts by weight of an alkaline component. Furthermore, Japanese Unexamined Patent Application, Laid-open No. 2000-290015 discloses a method of producing a neutral titania sol with transparency and dispersion stability in the neutral region and formed from deflocculated titanium oxide particles covered with a hydrated phosphate compound, by mixing a titania sol obtained by deflocculating hydrous titanium oxide with a water soluble titanium compound and a phosphate compound, and removing acid from the reaction liquid. In addition, Japanese Unexamined Patent Application, Laid-open No. Hei 7-89722 discloses a method in which a neutral titanium dioxide sol is stabilized with a hydroxycarboxylic acid or a derivative thereof, wherein prior to, during, or after the stabilization, the titanium dioxide sol is treated with a metal ion, an inorganic anion, a chelating [complexing] agent and/or an oxidizing agent.

As described above, a number of techniques have been disclosed, although the conventional technology to date has not been able to provide photocatalytic particles capable of exhibiting good photocatalytic function using a practical light source of extremely weak intensity such as a fluorescent lamp, while retaining good durability and dispersion stability in those cases when the photocatalyst is used with an organic material, nor an industrially useful method of producing a neutral, highly transparent slurry containing these types of particles.

SUMMARY OF THE INVENTION

The present invention takes the above factors into consideration, with an object of providing a method of producing photocatalyst particles capable of exhibiting good photocatalytic function using a practical light source of extremely low intensity such as a fluorescent lamp, as well as photocatalyst particles and powder, an organic polymer composition using such particles or powder, a neutral and highly transparent slurry and coating agent containing such particles, a film displaying photocatalytic properties formed therefrom, and articles containing such photocatalyst particles. Furthermore, the present invention also provides the above types of compositions and films in which there is little coloring, and films which are highly transparent.

In addition, one aspect of the object of the present invention provides a photocatalytic powder and slurry which offers a considerable improvement in industrial usability by displaying excellent dispersion stability, while suffering no loss in the photocatalytic activity of titanium dioxide, as well as a polymer composition, a coating agent, a photocatalytic molded article and a photocatalytic structural body formed using the powder or slurry.

In addition, the present invention provides a photocatalytic powder and slurry which, when applied to the surface of a fiber, paper or plastic material, or kneaded into such a material, or used in a coating material, exhibits excellent photocatalytic activity, durability and dispersion stability.

As a result of intensive research aimed at achieving the above object, the inventors of the present invention discovered that by complexing fine particles of titanium dioxide and a photocatalytically inactive compound such as a condensed phosphate salt under specific conditions, particles of the present invention could be produced. The inventors subsequently produced a slurry using these particles, and by using this slurry, were able to achieve the aforementioned objects.

In other words, the present invention relates to the aspects [1] to [88] described below.

[1] A method of producing composite particles of titanium dioxide and a compound inactive as a photocatalyst, comprising the steps of preparing a water based slurry of pH 3 to 5 comprising titanium dioxide, preparing a water based solution comprising a compound inactive as a photocatalyst, and reacting the slurry and the solution together at a pH of 4 to 10.

[2] A method of producing composite particles of titanium dioxide and a compound inactive as a photocatalyst according to aspect 1 above, wherein the concentration of titanium dioxide in the water based slurry comprising titanium dioxide is 0.1 to 10 mass %.

[3] A method of producing composite particles of titanium dioxide and a compound inactive as a photocatalyst according to either one of aspect 1 and aspect 2 above, wherein the concentration of titanium dioxide on mixing of the water based slurry comprising titanium dioxide and the water based solution comprising a compound inactive as a photocatalyst is no more than 5 mass %.

[4] A method of producing composite particles of titanium dioxide and a compound inactive as a photocatalyst according to any one of aspect 1 through aspect 3 above, wherein the reaction temperature between the water based slurry comprising titanium dioxide and the water based solution comprising a compound inactive as a photocatalyst is no more than 50° C.

[5] A method of producing composite particles of titanium dioxide and a compound inactive as a photocatalyst according to any one of aspect 1 through aspect 4 above, wherein the step of preparing the water based slurry comprising titanium dioxide includes a process for the wet synthesis of titanium dioxide, and does not include a process for producing titanium dioxide powder from the synthesized slurry.

[6] A method of producing composite particles of titanium dioxide and a compound inactive as a photocatalyst according to any one of aspect 1 through aspect 5 above, wherein the titanium dioxide comprises an anatase crystal form.

[7] A method of producing composite particles of titanium dioxide and a compound inactive as a photocatalyst according to any one of aspect 1 through aspect 6 above, wherein the titanium dioxide comprises a brookite crystal form.

[8] A method of producing composite particles of titanium dioxide and a compound inactive as a photocatalyst according to any one of aspect 1 through aspect 7 above, wherein the titanium dioxide comprises a rutile crystal form.

[9] A method of producing composite particles of titanium dioxide and a compound inactive as a photocatalyst according to any one of aspect 1 through aspect 8 above, wherein the titanium dioxide comprises at least two crystal forms of anatase, rutile and brookite forms.

[10] A method of producing composite particles of titanium dioxide and a compound inactive as a photocatalyst according to any one of aspect 1 through aspect 9 above, wherein the BET specific surface area of the titanium dioxide is within a range from 10 to 300 $m^2/g$.

[11] A method of producing composite particles of titanium dioxide and a compound inactive as a photocatalyst according to any one of aspect 1 through aspect 10 above, wherein the compound inactive as a photocatalyst is a salt selected from a group consisting of phosphates, condensed phosphates, borates, sulfates, condensed sulfates and carboxylates.

[12] A method of producing composite particles of titanium dioxide and a compound inactive as a photocatalyst according to any one of aspect 11 above, wherein the condensed phosphate is a salt selected from a group consisting of pyrophosphates, tripolyphosphates, tetrapolyphosphates, metaphosphates and ultraphosphates.

[13] A method of producing composite particles of titanium dioxide and a compound inactive as a photocatalyst according to any one of aspect 1 through aspect 10 above, wherein the compound inactive as a photocatalyst is at least one compound selected from a group consisting of Si compounds, Al compounds, P compounds, S compounds and N compounds.

[14] A method of producing composite particles of titanium dioxide and a compound inactive as a photocatalyst according to any one of aspect 1 through aspect 13 above, wherein the compound inactive as a photocatalyst comprises at least one metal selected from a group consisting of alkali metals, alkali earth metals, transition metals and Al.

[15] A method of producing composite particles of titanium dioxide and a compound inactive as a photocatalyst according to aspect 14 above, wherein the alkali metal is at least one metal selected from a group consisting of Na and K.

[16] A method of producing composite particles of titanium dioxide and a compound inactive as a photocatalyst according to aspect 14 above, wherein the alkali earth metal is at least one metal selected from a group consisting of Mg and Ca.

[17] A method of producing composite particles of titanium dioxide and a compound inactive as a photocatalyst according to aspect 14 above, wherein the transition metal is at least one metal selected from a group consisting of Fe and Zn.

[18] A method of producing composite particles of titanium dioxide and a compound inactive as a photocatalyst in which the titanium dioxide is surface treated with the compound inactive as a photocatalyst, wherein the composite particles display a higher photocatalytic activity than the raw material titanium dioxide.

[19] Composite particles of titanium dioxide and a compound inactive as a photocatalyst, produced by a method according to any one of aspect 1 through aspect 18 above.

[20] Composite particles of titanium dioxide and a compound inactive as a photocatalyst according to aspect 19 above, wherein the compound inactive as a photocatalyst exists partially on the surface of the titanium dioxide.

[21] A water based slurry comprising composite particles of titanium dioxide and a compound inactive as a photocatalyst, produced using a method according to any one of aspect 1 through aspect 18 above.

[22] Photocatalyst particles comprising particles according to either one of aspect 19 and aspect 20 above, wherein when 3.5 g of the photocatalyst particles spread uniformly across a flat surface of diameter 9 cm, placed within 5 L of dry air containing 20 ppm by volume of acetaldehyde, is irradiated with a day white fluorescent lamp producing an ultraviolet light intensity of 6 $\mu W/cm^2$ at a wavelength of 365 nm, the ratio of decomposition of the acetaldehyde after one hour of irradiation is at least 20%.

[23] Photocatalyst particles according to aspect 22 above, wherein the ratio of decomposition is at least 40%.

[24] Photocatalyst particles according to aspect 22 above, wherein the ratio of decomposition is at least 80%.

[25] Photocatalyst particles according to aspect 24 above, wherein the BET specific surface area of the composite particles of titanium dioxide and the compound inactive as a photocatalyst is within a range from 10 to 300 $m^2/g$.

[26] Photocatalyst particles according to aspect 25 above, wherein the titanium dioxide comprises an anatase crystal form.

[27] Photocatalyst particles according to aspect 25 above, wherein the titanium dioxide comprises a brookite crystal form.

[28] Photocatalyst particles according to aspect 25 above, wherein the titanium dioxide comprises a rutile crystal form.

[29] Photocatalyst particles according to aspect 25 above, wherein the titanium dioxide comprises at least two crystal forms of anatase, rutile and brookite crystal forms.

[30] Photocatalyst particles according to any one of aspect 25 through aspect 29 above, wherein the compound inactive as a photocatalyst is present in a quantity within a range from 0.01 to 50 mass % based on the mass of the titanium dioxide.

[31] Photocatalyst particles according to aspect 30 above, wherein the compound inactive as a photocatalyst is a salt selected from a group consisting of phosphates, condensed phosphates, borates, sulfates, condensed sulfates and carboxylates.

[32] Photocatalyst particles according to aspect 31 above, wherein the condensed phosphate is a salt selected from a group consisting of pyrophosphates, tripolyphosphates, tetrapolyphosphates, metaphosphates and ultraphosphates.

[33] Photocatalyst particles according to aspect 30 above, wherein the compound inactive as a photocatalyst is at least one compound selected from a group consisting of Si compounds, Al compounds, P compounds, S compounds and N compounds.

[34] Photocatalyst particles according to aspect 30 above, wherein the compound inactive as a photocatalyst comprises at least one metal selected from a group consisting of alkali metals, alkali earth metals, transition metals and Al.

[35] Photocatalyst particles according to aspect 34 above, wherein the alkali metal is at least one metal selected from a group consisting of Na and K.

[36] Photocatalyst particles according to aspect 34 above, wherein the alkali earth metal is at least one metal selected from a group consisting of Mg and Ca.

[37] Photocatalyst particles according to aspect 34 above, wherein the transition metal is at least one metal selected from a group consisting of Fe and Zn.

[38] Photocatalyst particles according to any one of aspect 30 through aspect 37 above, wherein the isoelectric point determined from the zeta potential measured using an electrophoresis light scattering method is no more than 4.

[39] A photocatalytic powder containing photocatalyst particles according to any one of aspect 30 through aspect 38 above.

[40] An organic polymer composition containing photocatalyst particles according to any one of aspect 30 through aspect 38 above.

[41] An organic polymer composition according to aspect 40 above, wherein the organic polymer of the organic polymer composition is at least one polymer selected from a group consisting of thermoplastic resins, thermosetting resins, synthetic resins, natural resins and hydrophilic polymers.

[42] An organic polymer composition according to aspect 40 above, wherein the organic polymer composition is at least one type of organic polymer composition selected from a group consisting of paints, coating compositions, compounds and master batches.

[43] An organic polymer composition according to any one of aspect 40 through aspect 42 above, comprising from 0.01 to 80 mass % of the photocatalytic powder based on the total mass of the composition.

[44] A photocatalytic molded article formed from an organic polymer composition according to any one of aspect 40 through aspect 43 above.

[45] A photocatalytic molded article according to aspect 44 above, wherein the photocatalytic molded article is a molded article of at least one material selected from a group consisting of fibers, films and plastics.

[46] An article produced from a photocatalytic molded article according to aspect 45 above.

[47] An article with photocatalyst particles according to any one of aspect 30 through aspect 38 above on the surface thereof.

[48] An article according to either one of aspect 46 and aspect 47 above, wherein the article is at least one article selected from a group consisting of building materials, machinery, vehicles, glass products, electric appliances, agricultural materials, electronic equipment, tools, eating utensils, bath goods, toilet goods, furniture, clothing, fabric products, fibers, leather goods, paper products, sports goods, bedding, containers, spectacles, signboards, piping, wiring, brackets, hygiene materials and automobile goods.

[49] A slurry comprising photocatalyst particles according to any one of aspect 30 through aspect 38 above.

[50] A slurry comprising photocatalyst particles, wherein a powder produced by drying the slurry is photocatalyst particles according to any one of aspect 30 through aspect 38 above.

[51] A slurry according to either one of aspect 49 and aspect 50 above, comprising water as a solvent.

[52] A slurry according to either one of aspect 49 and aspect 50 above, comprising from 0.01 to 50 mass % of photocatalyst particles.

[53] A slurry according to either one of aspect 49 and aspect 50 above, wherein the pH of the slurry is within a range from 5 to 9.

[54] A slurry according to aspect 53 above, wherein the pH of the slurry is within a range from 6 to 8.

[55] A slurry according to any one of aspect 49 through aspect 54 above, wherein the light transmittance of the slurry, when measured on a slurry with a photocatalyst particle concentration of 10 mass %, using a wavelength of 550 nm and an optical path length of 2 mm, is at least 20%.

[56] A slurry according to aspect 55 above, wherein the light transmittance is at least 30%.

[57] A coating agent which produces a film with photocatalytic properties, comprising photocatalyst particles according to any one of aspect 30 through aspect 38 above, and at least a binder.

[58] A coating agent which produces a film with photocatalytic properties, comprising a slurry according to any one of aspect 49 through aspect 56 above, and at least a binder.

[59] A coating agent according to either one of aspect 57 and aspect 58 above, wherein the binder comprises an organic compound.

[60] A coating according to aspect 59 above, wherein the organic compound is at least one organic compound selected from a group consisting of acrylic silicon, polyvinyl alcohol, melamine resin, urethane resin, acrylurethane, celluloid, chitin, starch sheet, polyacrylamide and acrylamide.

[61] A coating agent according to either one of aspect 57 and aspect 58 above, wherein the binder comprises an inorganic compound.

[62] A coating agent according to aspect 61 above, wherein the inorganic compound is selected from a group consisting of Zr compounds, Si compounds, Ti compounds and Al compounds.

[63] A method of producing a film which displays photocatalytic properties by applying a coating agent and curing the thus produced film, wherein the curing temperature is no more than 500° C., and the coating agent utilizes a coating agent according to any one of aspect 57 through aspect 62 above.

[64] A method of producing a film which displays photocatalytic properties according to aspect 63 above, wherein the curing temperature is no more than 200° C.

[65] A method of producing a film which displays photocatalytic properties according to aspect 63 above, wherein the curing temperature is no more than 30° C.

[66] An article with a film which displays photocatalytic properties, wherein the film which displays photocatalytic properties is produced by a method according to any one of aspect 63 through aspect 66 above.

[67] An article with a film which displays photocatalytic properties, wherein when a film of surface area 400 cm$^2$ which displays photocatalytic properties, placed within 5 L of dry air containing 60 ppm by volume of hydrogen sulfide, is irradiated with a day white fluorescent lamp producing an ultraviolet light intensity of 6 μW/cm$^2$ at a wavelength of 365 nm, the ratio of decomposition of the hydrogen sulfide after four hours of irradiation is at least 20%.

[68] An article according to either one of aspect 66 and aspect 67 above, wherein the film which displays photocatalytic properties has a film thickness within a range from 0.01 to 100 μm.

[69] An article according to aspect 68 above, wherein the film thickness is from 0.01 to 0.1 μm.

[70] An article according to aspect 68 above, wherein the film thickness is from 1 to 100 μm.

[71] An article according to any one of aspect 66 through aspect 70 above, wherein if the light transmittance at 550 nm for the article without a film which displays photocatalytic properties is termed T1%, and the light transmittance at 550 nm for the article with a film which displays photocatalytic properties is termed T2%, then the article has a film which displays photocatalytic properties with a portion for which the ratio T2/T1 is at least 0.9.

[72] An article according to any one of aspect 66 to aspect 70 above, wherein if the light reflectance at 550 nm for the article without a film which displays photocatalytic properties is termed R1%, and the light reflectance at 550 nm for the article with a film which displays photocatalytic properties is termed R2%, then the article has a film which displays photocatalytic properties with a portion for which the ratio R2/R1 is at least 0.9.

[73] An article according to any one of aspect 66 through aspect 72 above, wherein the film which displays photocatalytic properties has a pencil hardness of at least 2H.

[74] An article according to any one of aspect 66 through aspect 73 above, wherein after 24 hours irradiation with light from a day white fluorescent lamp producing an ultraviolet light intensity of 6 μW/cm$^2$ at a wavelength of 365 nm, the film which displays photocatalytic properties displays a contact angle with respect to water of no more than 20°.

[75] An article according to aspect 74 above, wherein the contact angle with respect to water is no more than 10°.

[76] An article according to aspect 75 above, wherein the contact angle with respect to water is no more than 5°.

[77] An article according to any one of aspect 66 through aspect 73 above, wherein after 24 hours irradiation with light from a day white fluorescent lamp producing an ultraviolet light intensity of 6 μW/cm$^2$ at a wavelength of 365 nm, and subsequent storage for 24 hours in the dark, the film which displays photocatalytic properties displays a contact angle with respect to water of no more than 20°.

[78] An article according to aspect 77 above, wherein the contact angle with respect to water after storage for 24 hours in the dark is no more than 10°.

[79] An article according to aspect 78 above, wherein the contact angle with respect to water after storage for 24 hours in the dark is no more than 5°.

[80] An article according to any one of aspect 66 through aspect 79 above, wherein after a 4000 hour xenon arc lamp accelerated exposure test, the film which displays photocatalytic properties displays a degree of yellowing of no more than 10, and a contact angle with respect to water of no more than 20° after 24 hours irradiation with light from a day white fluorescent lamp producing an ultraviolet light intensity of 6 μW/cm$^2$ at a wavelength of 365 nm.

[81] An article according to any one of aspect 66 through aspect 80 above, wherein the film which displays photocatalytic properties is formed on an inorganic substrate.

[82] An article according to aspect 81 above, wherein the inorganic substrate is a metal or a ceramic.

[83] An article according to aspect 81 above, wherein the inorganic substrate is at least one inorganic substrate selected from a group consisting of Si compounds and Al compounds.

[84] An article according to any one of aspect 66 through aspect 80 above, wherein the film which displays photocatalytic properties is formed on an organic substrate.

[85] An article according to aspect 84 above, wherein the organic substrate is an organic polymer.

[86] An article according to aspect 85 above, wherein the organic polymer is at least one organic polymer selected from a group consisting of polyethylene, polypropylene, polystyrene, nylon 6, nylon 66, aramid, polyethylene terephthalate, unsaturated polyester, polyvinyl chloride, polyvinylidene chloride, polyethylene oxide, polyethylene glycol, silicon resin, polyvinyl alcohol, vinyl acetal resin, polyacetate, ABS resin, epoxy resin, vinyl acetate resin, cellulose, rayon and other cellulose derivatives, urethane resin, polyurethane, urea resin, fluororesin, polyvinylidene fluoride, phenol resin, celluloid, chitin, starch sheet, acrylic resin, melamine resin and alkyd resin.

[87] An article according to any one of aspect 81 through aspect 86 above, wherein the article is at least one article selected from a group consisting of building materials, machinery, vehicles, glass products, electric appliances, agricultural materials, electronic equipment, tools, eating utensils, bath goods, toilet goods, furniture, clothing, fabric products, fibers, leather goods, paper products, sports goods, bedding, containers, spectacles, signboards, piping, wiring, brackets, hygiene materials and automobile goods.

[88] A method of imparting photocatalytic properties and hydrophilicity, wherein the light source for generating photocatalytic properties and hydrophilicity in an article according to any one of aspect 47, aspect 48 and aspect 87 is at least one light source selected from a group consisting of sun, fluorescent lamps, mercury lamps, xenon lamps, halogen lamps, mercury xenon lamps, metal halide lamps, light emitting diodes, lasers, and the combustion flames from organic material.

DETAILED DESCRIPTION OF THE INVENTION

Figure 1:
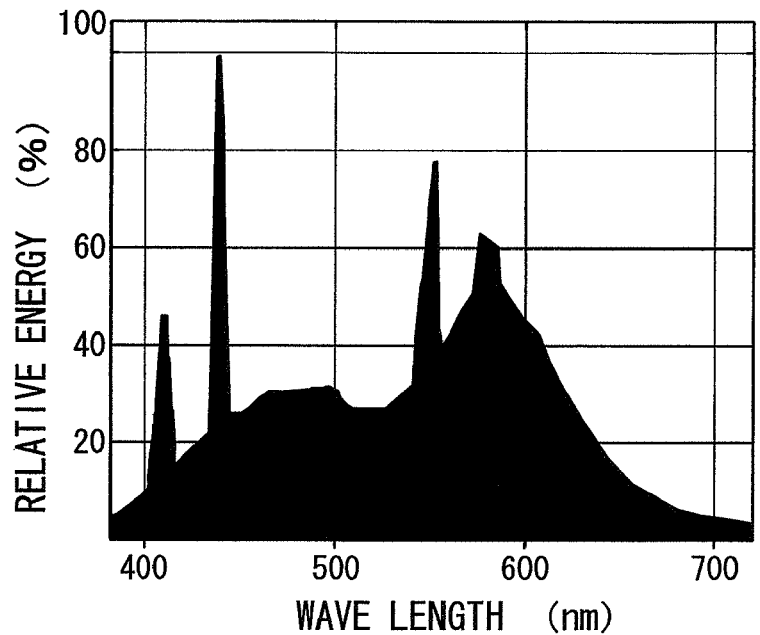
FIG. 1 is a sample light intensity spectrum for a day white fluorescent lamp.

A more detailed description of the present invention follows.

Among the methods of producing composite particles of titanium dioxide and a compound inactive as a photocatalyst according to the present invention, the methods described below are presented as preferred methods. Basically, aggregation of the raw material titanium dioxide and the generated composite particles is very strongly suppressed throughout the entire process, and as a result, novel composite particles with the type of photocatalytic function and durability not obtainable with conventional surface treatment methods can be produced.

Specifically, the method of producing the composite particles comprises the steps of preparing a water based slurry of pH 3 to 5 comprising titanium dioxide, preparing a water based solution comprising a compound inactive as a photocatalyst, and reacting the slurry and the solution together at a pH within a range from 4 to 10. This method is described in more detail below.

First, a water based slurry comprising titanium dioxide is prepared.

The BET specific surface area of the titanium dioxide is preferably within a range from 10 to 300 $m^2/g$, and even more preferably from 30 to 250 $m^2/g$, and most preferably from 50 to 200 $m^2/g$. If the BET specific surface area is less than 10 $m^2/g$ then the photocatalytic function decreases, whereas at values exceeding 300 $m^2/g$, productivity deteriorates to an impractical level.

The crystal type of the titanium dioxide may be any of anatase, rutile and brookite crystals, although anatase or brookite crystals are preferred, and brookite crystals are the most desirable. Furthermore, the titanium dioxide may also comprise at least two crystal types from among anatase, rutile and brookite crystals. If the titanium dioxide comprises at least two crystal types, then in some cases the activity exceeds that of any of the singular crystal types.

There are no particular restrictions on the method of producing the titanium dioxide, and suitable methods include vapor phase methods using $TiCl_4$ as the raw material, and liquid phase methods using an aqueous solution of $TiCl_4$ or an aqueous solution of titanyl sulfate as the raw material.

An example of a vapor phase method is the method presented in International Patent Application, No. WO01/16027. Specifically, this is a method of producing ultra fine particles of titanium oxide with a BET specific surface area of 10 to 200 $m^2/g$, wherein a gas containing titanium tetrachloride and an oxidizing gas are each preheated to a temperature of at least 500° C., and each gas is then supplied to a reaction tube at a flow velocity of at least 10 m/s. Furthermore, the particles containing titanium dioxide may also be ultra fine particles of mixed crystal oxides incorporating mixed crystals with titanium-oxygen-silicon bonds within the primary particles. An example of a method for producing such particles is the method presented in International Patent Application, No. WO01/56930. This is a method of producing ultra fine oxide particles containing mixed crystal primary particles with a BET specific surface area of 10 to 200 $m^2/g$, wherein a mixed gas comprising at least two halogenated metal compounds selected from a group consisting of chlorides, bromides and iodides of titanium and silicon (hereafter referred to as a "mixed halogenated metal gas"), and an oxidizing gas are each preheated to a temperature of at least 500° C., and the two gases are then reacted together. In this method, both the mixed halogenated metal gas and the oxidizing gas are preferably supplied to the reaction tube at a flow velocity of at least 10 m/s, and even more preferably at least 30 m/s, and the gases are preferably reacted together in the reaction tube at a high temperature exceeding 600° C., with the residence and reaction time of the gases within the tube being no more than 1 second.

An example of a liquid phase method is the method presented in Japanese Unexamined Patent Application, Laid-open No. Hei 11-43327. This is a method of producing a water dispersed sol of brookite titanium oxide by adding titanium tetrachloride to hot water of 75 to 100° C., and conducting a hydrolysis at a temperature within a range from 75° C. to the boiling point of the solution. In order to impart a high degree of transparency to a slurry, a coating agent and a film according to the present invention, this type of titanium dioxide synthesized by a liquid phase method is the preferred raw material. In addition, the liquid phase synthesized titanium dioxide is preferably used by maintaining the slurry state produced during the synthesis, that is, without passing through a step of producing a titanium dioxide powder. If a step for producing a powder is employed after the liquid phase synthesis, then aggregation of the titanium dioxide occurs, making it more difficult to achieve a high degree of transparency. Furthermore, although techniques are available for breaking up such aggregations, using an air flow crushing device such as a jet mill or a micronizer, a roller mill, or a pulverizer, these techniques increase processing time, and lead to contamination by impurities during the crushing step and a lack of uniformity of particle size distribution, and are consequently not desirable.

The titanium dioxide concentration of the prepared water based slurry comprising titanium dioxide is preferably within a range from 0.1 to 10 mass %. Concentration values from 0.5 to 5 mass % are even more preferred. If the slurry concentration of titanium dioxide exceeds 10 mass %, then the titanium dioxide undergoes undesirable aggregation in the mixing step described below. Furthermore, if the concentration is less than 0.1 mass %, then the productivity deteriorates to an undesirable level.

The pH of the prepared water based slurry comprising titanium dioxide is preferably within a range from 3 to 5. If the pH is lower than 3, then during the reaction step described below, localized neutralization and heat generation causes undesirable aggregation of the titanium dioxide during the mixing process. Furthermore, if the pH exceeds 5, then aggregation of the titanium dioxide is more likely to proceed, which is also undesirable. After preparation of water based slurry of the aforementioned titanium dioxide from the vapor phase method or from the liquid phase method, the pH can be adjusted if necessary, using treatment by electrodialysis or an ion exchange resin.

Next, a water based solution comprising a compound inactive as a photocatalyst is prepared. One possible method for complexing the compound inactive as a photocatalyst with the aforementioned titanium dioxide involves adding a powder of the compound inactive as a photocatalyst to the titanium dioxide slurry described above, and dissolving the powder, but this method results in a reduction in the visible light absorption coefficient of the titanium dioxide described below, and is consequently undesirable.

Examples of the compound inactive as a photocatalyst include phosphates, condensed phosphates, borates, sulfates, condensed sulfates, carboxylates, Si compounds, Al compounds, P compounds, S compounds and N compounds. Furthermore, these compounds can be used singularly, or in combinations of a plurality of compounds. Of the above compounds, salts of polybasic acids such as condensed phosphates, borates, condensed sulfates and polyvalent carboxylates are preferred, and condensed phosphates are particularly desirable.

Examples of condensed phosphates include pyrophosphates, tripolyphosphates, tetrapolyphosphates, metaphosphates and ultraphosphates. Of these, pyrophosphates and tripolyphosphates are particularly preferred.

The cations contained within the above salts are preferably alkali metals, alkali earth metals, transition metals or Al. Amongst alkali metals, Na and K are preferred. Amongst alkali earth metals, Mg and Ca are preferred. Amongst transition metals, Fe and Zn are preferred.

Furthermore, in those case in which the compound inactive as a photocatalyst for complexing with the titanium dioxide is only sparingly soluble in water, aqueous solutions of a plurality of raw materials for generating the sparingly watersoluble compound are prepared. For example, in order to complex calcium pyrophosphate with titanium dioxide, an aqueous solution of sodium pyrophosphate and an aqueous solution of calcium chloride are prepared.

The concentration of the compound inactive as a photocatalyst (hereafter, this compound may also be referred to as an "inactive compound") within the water based solution comprising the inactive compound is preferably no more than 40 mass %, and even more preferably no more than 20 mass %. At concentration levels exceeding 40 mass %, undesirable localized aggregation of the titanium dioxide occurs upon mixing during the mixing step described below.

The total quantity of the prepared compound inactive as a photocatalyst is typically within a range from 0.01 to 100 mass %, and preferably from 0.1 to 50 mass %, based on the mass of titanium dioxide. If the total quantity of the compound inactive as a photocatalyst is less than 0.01 mass %, then the reactivity with titanium dioxide deteriorates. In contrast, if the total quantity of the compound inactive as a photocatalyst exceeds 100 mass %, then the process becomes uneconomic, and also leads to aggregation of the titanium dioxide.

Next, the water based slurry comprising titanium dioxide and the water based solution comprising a compound inactive as a photocatalyst are mixed together and reacted.

The pH at mixing is preferably within a range from 4 to 10, with pH values from 5 to 9 being even more desirable. If the pH is lower than 4, then the reactivity between the titanium dioxide and the compound inactive as a photocatalyst is undesirably low. Furthermore if the pH exceeds 10, then aggregation of the titanium dioxide occurs upon mixing, which is also undesirable. In addition, in terms of selection of the material for the reaction apparatus, if the mixing pH is lower than 4, then cheap metal materials such as stainless steel can no longer be used.

In order to adjust the pH at mixing, either pH adjustment can be conducted at the time of mixing of the water based slurry comprising titanium dioxide and the water based solution comprising a compound inactive as a photocatalyst, or the pH of the water based solution comprising a compound inactive as a photocatalyst can be adjusted in advance so that the pH at mixing falls within a set range. Examples of methods for adjusting the pH include using aqueous solutions of mineral acids such as hydrochloric acid or sulfuric acid, or aqueous solutions of sodium hydroxide or ammonia. However, in order to avoid localized aggregation of the raw material titanium dioxide or the product composite particles within those regions where such a pH regulator has been added and mixed, the quantity of the pH regulator should preferably be kept to an absolute minimum, or only dilute concentrations should be used.

Examples of suitable methods for mixing the water based slurry comprising titanium dioxide and the water based solution comprising a compound inactive as a photocatalyst include adding the water based solution comprising a compound inactive as a photocatalyst in a continuous manner to the water based slurry comprising titanium dioxide, or adding both reactants simultaneously to a reaction vessel.

The concentration of titanium dioxide following mixing of the water based slurry comprising titanium dioxide and the water based solution comprising a compound inactive as a photocatalyst is preferably no more than 5 mass %, and even more preferably no more than 3 mass %. If the mixing process results in a post mixing concentration exceeding 5 mass %, then undesirable localized aggregation of the titanium dioxide may occur during mixing.

The temperature of the reaction between the water based slurry comprising titanium dioxide and the water based solution comprising a compound inactive as a photocatalyst is preferably no more than 50° C., and even more preferably no more than 30° C. If the temperature exceeds 50° C., then undesirable aggregation of the fine particles occurs inside the reaction vessel.

In addition, the water based slurry following reaction may also be subjected to demineralization. Removal of excess salts is effective in increasing the dispersibility of the particles. Examples of demineralization methods include methods using ion exchange resins, methods using electrodialysis, methods using ultrafiltration membranes, and methods using a rotary filter press (manufactured by Kotobuki Engineering and Manufacturing Co., Ltd.). The pH following demineralization is preferably within a range from 5 to 9, and even more preferably from 6 to 8.

If a compound inactive as a photocatalyst is present on the surface of titanium dioxide, then the photocatalytic activity will typically decrease, but surprisingly the inventors discovered that if surface treatment is performed using the method described above, then the photocatalytic activity improves beyond that of the untreated product, even though a compound inactive as a photocatalyst is present on the surface of the titanium dioxide. Furthermore, this effect is realized when aggregation of the raw material titanium dioxide and the generated composite particles is strongly suppressed throughout the entire process, as in the present invention. The effect is particularly marked in cases where the surface is partially treated with a polybasic acid. The reason for this observation is not entirely clear, although it is considered that one factor may be that-multi electron attracting carboxyl groups or sulfonyl groups and the like display a preferred interaction with specific Ti atoms on the surface of the titanium dioxide, and as a result electrons generated within the titanium dioxide particles upon light absorption undergo charge separation at the surface, causing an increase in the photocatalytic activity.

Furthermore, it is thought that another factor is that new energy levels are formed for composite oxides comprising specific Ti atoms on the surface of the titanium dioxide, and that, depending on the nature of those composite oxides, band gaps which are responsive to visible light can arise. Generally, it is assumed that surface treatment with a material inactive as a photocatalyst leads to a suppression of the photocatalytic activity of the titanium dioxide, but this is not necessarily always true. Furthermore, another advantage is that because at least the terminal atomic groups of the surface treatment groups are photocatalytically inactive, and the surface treatment groups inhibit contact between organic based materials and the titanium oxide in a steric manner, then in those cases in which the particles are applied to organic based materials, the durability of the organic based materials improves. Generally, it is thought that this phenomenon arises because the materials to undergo decomposition are either gases or liquids, and the positional relationship between these materials and the photocatalyst particles is fluid (that is, the materials to undergo decomposition are movable), whereas the organic substrate is a solid, and the steric positional relationship between the photocatalyst particles and the organic substrate is a fixed relationship.

In other words, only by using a surface treatment process in which the dispersibility of the titanium dioxide is maintained throughout, can an effective interaction be realized between the polybasic acid and specific Ti atoms, thereby enabling levels of photocatalytic activity and durability which exceed those of the raw material, and the generation of a slurry with superior dispersibility.

A description of the photocatalytic activity of the photocatalyst particles follows.

There are no particular restrictions on the method of measuring the photocatalytic activity, and an example of a suitable method involves spreading 3.5 g of the photocatalyst particles uniformly across a flat surface with a diameter of 9 cm, placing the sample in 5 L of dry air containing 20 ppm by volume of acetaldehyde, irradiating the sample with a day white fluorescent lamp producing an ultraviolet light intensity of 6 $\mu W/cm^2$ at a wavelength of 365 nm, and then determining the ratio of decomposition of the acetaldehyde (hereafter, may be abbreviated as DWA) after one hour of irradiation.

This decomposition ratio can be measured in the manner described below, for example. A glass laboratory dish having an internal diameter of 9 cm containing 3.5 g of photocatalyst particles (or a powder containing such particles) spread evenly across the bottom surface of the dish is placed inside a 5 L capacity vessel with good transmittance of visible light through to ultraviolet light (such as a bag formed from polyvinyl fluoride film). Subsequently, 5 L of dry air containing 20 ppm by volume of acetaldehyde is charged into and removed from the vessel at least once, and a further 5 L of dry air containing 20 ppm by volume of acetaldehyde is used to fill the vessel again, ensuring the gas inside the vessel has been adequately exchanged. The vessel is then irradiated from the exterior for a period of one hour, and the ratio of decomposition, excluding any adsorption of the acetaldehyde (hereafter, this value is simply described as the "ratio of decomposition"), is measured. In this measurement, a day white fluorescent lamp is used as the light source, resulting in light with an ultraviolet light intensity of 6 $\mu W/cm^2$ at a wavelength of 365 nm being irradiated onto the spread out photocatalyst particles.

This measurement is described below in further detail.

In those cases in which the particles are in the form of a powder, the powder is first prepared. In those cases in which the particles are in the form of a slurry, the slurry is dried, either by heating or under reduced pressure, preferably at a temperature exceeding the boiling point of the solvent, and a crushed powder is prepared. In the case of a water based slurry, the drying should be conducted at a temperature of 100 to 120° C. 3.5 g of powder prepared in this manner is spread evenly across the bottom surface of a glass laboratory dish with an internal diameter of 9 cm, and the dish is then placed inside a L capacity bag made of polyvinyl fluoride film. An example of a suitable polyvinyl fluoride film is a Tedlar Bag (AAK-5, manufactured by GL Sciences Inc.). Meanwhile, dry air containing 20 ppm by volume of acetaldehyde can be prepared from dry air using a permeator (PD-1B, manufactured by GasTech Corporation). The dry air can utilize commercially available compressed air (such as air compressed to a pressure of approximately 14.7 MPa at 35° C., with any condensed water and compressor oil removed). Subsequently, 5 L of dry air containing 20 ppm by volume of acetaldehyde is charged into and removed from the polyvinyl fluoride film bag at least once. The titanium dioxide will adsorb a certain quantity of the acetaldehyde, and consequently this operation is necessary. 5 L of gas of the same concentration is then used to refill the bag again, and the initial acetaldehyde concentration COT (ppm by volume) in the bag is measured using a detector tube (No. 92L, manufactured by GasTech Corporation).

The initial acetaldehyde concentration at measurement is preferably no more than 50 ppm by volume, and even more preferably no more than 20 ppm by volume. In order to evaluate the deodorizing effect within living environment spaces, extremely low concentration conditions are preferred. For example, if acetaldehyde concentration is greater than 1.4 ppm by volume, then it is detected as a strong odor. Furthermore, even if measurements are conducted at concentration levels exceeding 100 ppm by volume, the results will not necessarily indicate photocatalytic function at low concentration levels. This phenomenon can also be appreciated through a Langmuir Hinshelwood interpretation in catalytic reaction rate analysis.

A day white fluorescent lamp is prepared as a light source. Examples of suitable day white fluorescent lamps include "Hi-white" FL20SS-N/18-B, manufactured by Hitachi GE Lighting Co., Ltd. The relative energy spectrum of this type of fluorescent lamp is known, and is shown in the spectrum of FIG. 1 (day white fluorescent lamp catalog, Hitachi GE Lighting Co., Ltd.).

Measurement of the light intensity utilizes, for example, a UVA-365 device, manufactured by Atex Co., Ltd. Using this device, the light intensity at 365 nm can be measured.

Next, light irradiation is commenced from outside the bag using a light of predetermined light intensity. One hour after this irradiation commencement point, the acetaldehyde concentration C1T in the bag (ppm by volume) is remeasured.

As a control test, a test is also conducted using the same operations as above, but placing the bag in the dark for 1 hour. The initial acetaldehyde concentration for this control test is termed C0B (ppm by volume), and the acetaldehyde concentration after 1 hour is termed C1B (ppm by volume).

The rate of decomposition excluding adsorption (DWA) is defined as:

$$DWA=\{(C0T-C1T)-(C0B-C1B)\}/C0T\times100(\%)$$

Photocatalyst particles according to the present invention are composite particles of titanium dioxide and a compound inactive as a photocatalyst, and display a higher photocatalytic activity than the raw material titanium dioxide particles. Specifically, the DWA value of the composite particles is higher than the DWA value for the raw material titanium dioxide particles.

Furthermore, photocatalyst particles according to the present invention comprise composite particles of titanium dioxide and a compound inactive as a photocatalyst, wherein when 3.5 g of the photocatalyst particles spread uniformly across a flat surface of a diameter of 9 cm, placed in 5 L of dry air containing 20 ppm by volume of acetaldehyde, is irradiated with a day white fluorescent lamp producing an ultraviolet light intensity of 6 $\mu W/cm^2$ at a wavelength of 365 nm, the ratio of decomposition of the acetaldehyde after one hour of irradiation is at least 20%. The DWA value is preferably at least 40%, and even more preferably 80% or greater.

The BET specific surface area of the photocatalyst particles is preferably within a range from 10 to 300 $m^2/g$, and even more preferably from 30 to 250 $m^2/g$, and most preferably from 50 to 200 $m^2/g$. If the BET specific surface area is less than 10 $m^2/g$ then the photocatalytic function decreases, whereas at values exceeding 300 $m^2/g$, productivity deteriorates to an impractical level.

The crystal type of the titanium dioxide incorporated within the photocatalyst particles may be any of anatase, rutile and brookite crystals, although anatase or brookite crystals are preferred, and brookite crystals are the most desirable. Furthermore, the titanium dioxide may also comprise at least two crystal types from among anatase, rutile and brookite crystals. If the titanium dioxide comprises at least two crystal types, then in some cases the activity exceeds that of any of the singular crystal types.

Furthermore, the compound inactive as a photocatalyst may exist inside the titanium dioxide particles or on the surface of the particles. In those cases in which the compound is present on the surface of the titanium dioxide particles, it is preferable that the compound form a partial surface coating. In the former case, n-type or p-type semiconductors can be formed, improving the visible light activity, whereas in the latter case, by suppressing contact with organic matter, the number of fields of potential practical application for the particles can be increased.

Next, a description is given of the latter of the two cases described above. Examples of the compound inactive as a photocatalyst include phosphates, condensed phosphates, borates, sulfates, condensed sulfates, carboxylates, Si compounds, Al compounds, P compounds, S compounds and N compounds. Other examples include silica, zirconia, alumina, magnesia, calcia, amorphous titania, mullite and spinel. These compounds can be used singularly, or in combinations of a plurality of compounds.

Of the above compounds, salts of polybasic acids such as condensed phosphates, borates, condensed sulfates and polyvalent carboxylates are preferred, and condensed phosphates are particularly desirable.

Examples of condensed phosphates include pyrophosphates, tripolyphosphates, tetrapolyphosphates, metaphosphates and ultraphosphates. Of these, pyrophosphates and tripolyphosphates are particularly preferred.

The cations contained within the above salts are preferably alkali metals, alkali earth metals, transition metals or Al. Amongst alkali metals, Na and K are preferred. Amongst alkali earth metals, Mg and Ca are preferred. Amongst transition metals, Fe and Zn are preferred.

The quantity of these types of compounds inactive as a photocatalyst is typically within a range from 0.01 to 50 mass %, and preferably from 0.1 to 20 mass %, based on the mass of titanium dioxide. If the quantity of the compound inactive as a photocatalyst is less than 0.01 mass %, then the photocatalytic activity of the titanium dioxide with respect to media such as plastic, paper or fiber causes a deterioration in the durability of the medium itself. In contrast, if the quantity of the compound inactive as a photocatalyst exceeds 50 mass %, then the photocatalyst particles become uneconomic.

An example of a preferred embodiment comprises composite particles of titanium dioxide and a condensed phosphate, wherein if the BET specific surface area is A $m^2/g$ and the quantity of P within the particles is B mass %, then $A \geq 50$ and B/A is within a range from 0.002 to 0.01. Particles in which a condensed phosphate is present on the surface of a brookite titanium dioxide or an anatase titanium dioxide are even more desirable.

In addition, the isoelectric point determined from the zeta potential measured for the photocatalyst particles of the present invention using an electrophoresis light scattering method is preferably no more than 4, and even more preferably no more than 3, and most preferably no more than 2. A description of a method of measuring the zeta potential is provided below.

Many different methods exist for measuring the zeta potential, but the measurement principle adopted in the present invention involves analyzing the electrophoretic rate from the size of the frequency shift according to a laser Doppler method, or a so-called electrophoresis light scattering method. Specifically, the zeta potential can be measured using a ELS-8000 device, manufactured by Otsuka Electronics Co., Ltd.

0.01 g (the tip of a spatula) of a sample powder is placed in 50 ml of a 0.01 mol/l NaCl solution, the pH is adjusted, where necessary, by adding 0.01 or 0.1 mol/l solutions of HCl or NaOH, and the mixture is subjected to ultrasound dispersion for approximately one minute before being shifted to the measurement device.

A photocatalytic powder of the present invention can be added to an organic polymer and used as a composition. Examples of organic polymers which can be used include thermoplastic resins, thermosetting resins, natural resins, synthetic resins and hydrophilic polymers. Because of the presence of the aforementioned compound inactive as a photocatalyst, the organic polymer and the photocatalytically active surface of the titanium dioxide do not come in direct contact, and consequently the organic polymer of the medium does not deteriorate through decomposition, meaning the durability of the organic polymer can be improved.

Specific examples of this type of organic polymer include polyolefins such as polyethylene, polypropylene and polystyrene; polyamides such as nylon 6, nylon 66 and aramid; polyesters such as polyethylene terephthalate and unsaturated polyester; as well as polyvinyl chloride, polyvinylidene chloride, polyethylene oxide, polyethylene glycol, silicon resin, polyvinyl alcohol, vinyl acetal resin, polyacetate, ABS resin, epoxy resin, vinyl acetate resin, cellulose, rayon and other cellulose derivatives, urethane resin, polyurethane, urea resin, fluororesin, polyvinylidene fluoride, phenol resin, celluloid, chitin, starch sheet, acrylic resin, melamine resin and alkyd resin.

These types of organic polymer compositions incorporating a photocatalytic powder of the present invention can be used in a variety of forms including compounds or master batches. The concentration of photocatalytic powder within such an organic polymer composition is preferably within a range from 0.01 to 80 mass %, and even more preferably from 1 to 50 mass %, based on the total mass of the composition. Furthermore, in order to improve the removal of substances with offensive odors, adsorbents such as active carbon or zeolite may be added to the organic polymer composition. In the present invention, a polymer molded article with photocatalytic properties can be produced by molding a polymer composition described above. Examples of this type of molded article include fiber, film and plastic molded articles. Specifically, these types of molded articles can be applied to a variety of building materials, machinery, vehicles, glass products, electric appliances, agricultural materials, electronic equipment, tools, eating utensils, bath goods, toilet goods, furniture, clothing, fabric products, fibers, leather goods, paper products, sports goods, bedding, containers, spectacles, signboards, piping, wiring, brackets, hygiene materials, automobile goods, outdoor goods such as tents, masks, stockings and socks.

A slurry in the present invention describes a solvent dispersion of the aforementioned photocatalyst particles. There are no particular restrictions on the method of preparing the slurry, and suitable methods include diluting the slurry with a solvent following the aforementioned surface treatment reaction, and methods in which the surface treatment reaction slurry is filtered and washed to yield a solid containing the photocatalyst particles, and a solvent is then added to this solid. In the latter case, aggregation of the particles may occur, so the former method is preferred.

There are no particular restrictions on the solvent used in the formation of the slurry, although because the surface of the photocatalyst particles is typically hydrophilic, hydrophilic solvents are preferred. Water based solvents such as water or mixed solvents of water and hydrophilic organic solvents are particularly preferred.

There are no particular restrictions on the content of photocatalyst particles within the slurry, although quantities within a range from 0.01 to 50 mass %, and more preferably from 1 to 40 mass % are desirable. If the quantity of photocatalytic powder is less than 0.01 mass % then an adequate photocatalytic effect cannot be achieved after coating. In contrast, if the quantity of powder exceeds 50 mass %, then not only do problems of increased viscosity arise, but the coating also becomes uneconomic.

Furthermore, when a solvent comprising water is used, the pH of the slurry is preferably within a range from 5 to 9, and even more preferably from 6 to 8. If the pH is lower than 5 or greater than 9, then the slurry has an undesirable effect on living organisms and the environment, and displays a corrosive action towards metals which cannot be ignored, making the slurry unsuitable for use on metal substrates.

In addition, a slurry of the present invention is characterized by a high transmittance value. A description of a method of measuring the transmittance follows. A spectrophotometer or a spectrophotometric colorimeter is used for measuring the transmittance. The description below focuses on measurements using a CM-3700d spectrophotometric colorimeter manufactured by Minolta Co., Ltd.

First a slurry of 10% concentration is prepared in a glass cell with an optical path length of 2 mm. Using a xenon lamp as the light source, diffuse reflected light from an integrating sphere is irradiated through the sample inside the glass cell, and the transmitted light is captured by a measuring spectrometer. Meanwhile, diffused light from inside the integrating sphere is captured by an illuminating light spectrometer, and each light sample is dispersed into a spectrum, and the transmittance is measured at each wavelength.

A characteristic of the present invention is that when the concentration of photocatalyst particles within the slurry is set to 10 mass %, the transmittance at 550 nm through a 2 mm thickness of slurry (the optical path length) is at least 20%, and preferably at least 30%. By using this type of slurry, the design and coloring of the object to be coated can be largely retained, making the slurry very advantageous in practical applications.

Furthermore, a slurry of the present invention also has good visible light absorption characteristics across a wide portion of the visible light spectrum.

Here, the absorption coefficient is defined as:

$$\text{Absorption coefficient} = 100 - \text{transmittance} - \text{reflectance} \quad (A)$$

In the formula (A), the transmittance is the value measured according to the method described above.

Measurement of the reflectance in the formula (A) can utilize the same apparatus used for measuring the transmittance. First, a similar sample to that used for measuring the transmittance (a slurry of 10% concentration placed in a glass cell with an optical path length of 2 mm) is prepared. Using a xenon lamp as the light source, diffuse reflected light from an integrating sphere is irradiated onto the sample inside the glass cell, and of the reflected light, reflected light in a direction forming an angle of 8 degrees relative to the axis perpendicular to the sample surface is captured by a measuring spectrometer. Meanwhile, diffused light from inside the integrating sphere is captured by an illuminating light spectrometer, and each light sample is dispersed into a spectrum, and the reflectance is measured at each wavelength.

A characteristic of the present invention is that when the concentration of photocatalyst particles within the slurry is set to 10 mass %, the absorption coefficient at 400 nm for a 2 mm thickness of slurry (the optical path length) is at least 25%, and preferably at least 30%. Furthermore, the absorption coefficient at 550 nm is preferably within a range from 8 to 30%, and even more preferably from 10 to 20%. If the absorption coefficient at 550 nm is less than 8%, then visible light cannot be used effectively, whereas if the absorption coefficient exceeds 30% then coloring becomes more noticeable.

In addition, in order to improve the adhesion and the photocatalytic function of the slurry during coating or molding, a variety of metal oxides may also be added to the slurry. The metal elements can be appropriately selected from the transition metals, alkali earth metals, alkali metals, group IIIb metals or group IV metals. Of these, Zr, Si, Sn and Ti are preferred, and Zr and Si are particularly desirable.

There are no particular restrictions on the method of adding a metal oxide, and in one suitable method, a sol synthesized by a liquid phase method using a metal alkoxide as the raw material is added to the slurry. In this case, the BET specific surface area of the metal oxide particles is preferably within a range from 10 to 500 $m^2/g$, and even more preferably from 30 to 450 $m^2/g$, and most preferably from 50 to 400 $m^2/g$.

In addition, a method in which a metal alkoxide is added to the slurry and hydrolyzed, thereby depositing metal oxide particles onto the surface of the photocatalyst particles, is also preferred. In this case, the metal oxide preferably forms a partial surface coating on the photocatalyst particles. This partial coating may form islands, an arckipelago or a muskmelon pattern.

The reasons why addition of this type of metal oxide lead to an improvement in the photocatalytic function of a molded from such as a coating film are not entirely evident, although it is thought that possible reasons may include a promotion of charge separation on the photocatalyst particles due to the electron attracting properties of the added metal oxide, and the fact that in those cases where the conduction band level of the added metal oxide is lower than the conduction band level of the photocatalyst particles, the metal oxide may capture electrons from the photocatalyst particles.

Furthermore, a binder can be added to the dispersion (slurry) to form a coating agent, and a photocatalytic structural body can then be produced by applying the coating agent to the surface of the types of structural bodies described below. In other words, the coating agent can be used as a paint or a coating composition. There are no particular restrictions on the binder material used in the present invention, and either an organic based binder or an inorganic binder can be used. Suitable organic binders include water soluble binders, and specific examples include polyvinyl alcohol, melamine resin, urethane resin, celluloid, chitin, starch sheet, polyacrylamide and acrylamide and the like. Furthermore, suitable inorganic binders include Zr compounds, Si compounds, Ti compounds and Al compounds, and specific examples include zirconium compounds such as zirconium oxychloride, zirconium hydroxychloride, zirconium nitrate, zirconium sulfate, zirconium acetate, zirconium ammonium carbonate and zirconium propionate; silicon compounds such as alkoxysilanes, partial hydrolysis products of alkoxysilanes produced using a mineral acid, and silicates; as well as metal alkoxides of aluminum, Ti or zirconium, and partial hydrolysis products thereof produced using a mineral acid. Furthermore, other suitable examples include materials produced by selecting a plurality of metal alkoxides from aluminum, silicon, titanium and zirconium alkoxides, and complexing or hydrolyzing the mixture. Of these, cohydrolysis products of aluminum alkoxide and titanium alkoxide, and cohydrolysis products of aluminum alkoxide and silicon alkoxide are preferred.

In particular, if a binder with a plurality of carboxyl groups or sulfonyl groups as functional groups is used, then the photocatalytic function under a practical, low intensity light source such as a fluorescent lamp can be improved. A specific example of this type of binder is a water soluble urethane emulsion. The reason for this improved photocatalytic function is not entirely clear, although it is believed that possible factors include the fact that, in the same manner as described above in relation to the surface treatment of titanium dioxide with a polybasic acid, the multi-electron attracting carboxyl groups or sulfonyl groups within the water soluble urethane emulsion display an interaction with Ti atoms on the surface of the titanium dioxide, and as a result, electrons generated within the titanium dioxide particles upon light absorption undergo charge separation at the surface, causing an increase in the photocatalytic activity, or the possibility of a variation in the band gap at the surface of the titanium dioxide.

The quantity of binder added to a coating agent is typically within a range from 0.01 to 20 mass %, and preferably from 1 to 10 mass %. If the quantity of binder is less than 0.01 mass %, then insufficient adhesion is produced following application, whereas if the quantity exceeds 20 mass %, then not only do problems of increased viscosity arise, but the coating also becomes uneconomic.

Furthermore, the pH of the coating agent following mixing with the binder is preferably within a range from 5 to 9, and even more preferably from 6 to 8. If the pH is lower than 5 or greater than 9, then the coating agent has an undesirable effect on living organisms and the environment, and displays a corrosive action towards metals which cannot be ignored, making the coating agent unsuitable for use on metal substrates. Depending on the pH level, the pH of the slurry comprising the photocatalyst particles may be adjusted in advance, in order to achieve a pH following mixing of the binder which falls within the range from 5 to 9.

If either an organic binder or a partial hydrolysis product of an alkoxysilane produced using a mineral acid is employed as the binder, then application and subsequent curing can be performed at temperatures below 30° C. Furthermore, application can be performed at a temperature below 30° C., and curing can then be performed at a temperature of no more than 200° C. In addition, an inorganic binder can also be used on an inorganic substrate, with application performed at a temperature below 30° C., and curing can then be performed at a temperature of no more than 500° C., thereby generating a film with a high degree of hardness. The photocatalytic function may also be increased by improving the crystallinity of the titanium dioxide within the film, and in some cases, heating at a temperature of 300 to 500° C. may be recommended.

Furthermore, the photocatalytic capacity of articles with a film which displays photocatalytic activity according to the present invention have the characteristics described below.

When a film of surface area 400 $cm^2$ which displays photocatalytic activity, placed in 5 L of dry air containing 60 ppm by volume of hydrogen sulfide, is irradiated with a day white fluorescent lamp producing an ultraviolet light intensity of 6 $\mu W/cm^2$ at a wavelength of 365 nm, the ratio of decomposition of the hydrogen sulfide (hereafter, may be abbreviated as simply DWH) after six hours of irradiation, is at least 20%.

This decomposition ratio can be measured in the manner described below, for example. An article with a film which displays photocatalytic properties is placed inside a 5 L capacity bag formed from polyvinyl fluoride film, so that the surface area of the article exposed to the subsequent irradiation is 400 $cm^2$. Subsequently, 5 L of dry air containing 60 ppm by volume of hydrogen sulfide is charged into and removed from the vessel at least once, and a further 5 L of dry air containing the same concentration of acetaldehyde is then used to fill the vessel again, ensuring the gas inside the vessel has been adequately replaced. The vessel is then irradiated from the exterior for a period of six hours, and the ratio of decomposition, excluding any adsorption of the hydrogen sulfide, is measured. In this measurement, a day white fluorescent lamp is used as the light source, resulting in light with an ultraviolet light intensity of 6 $\mu W/cm^2$ at a wavelength of 365 nm being irradiated onto the article with a photocatalytic film.

In addition, because the present invention uses a slurry with a high light transmittance value as the raw material, a film obtained from a coating agent using such a slurry as a raw material also displays a high degree of transparency. In order to achieve a highly transparent film, it is recommended that titanium dioxide synthesized by a liquid phase method be used as the raw material for the photocatalyst particles. Specific examples of suitable photocatalyst particles include those produced by the surface treatment, with a salt of a polybasic acid, of particles generated by thermal hydrolysis or neutral hydrolysis of an aqueous solution of $TiCl_4$ or an aqueous solution of titanyl sulfate. Typically, the ideal thickness of a film for effectively exhibiting photocatalytic activity is within a range from 0.01 to 100 μm. Furthermore, in order to effectively suppress interference fringes, the film thickness is preferably either within a range from 0.01 to 0.1 μm, or greater than 1 μm.

Provided the substrate is transparent, the transparency of the photocatalytic film formed on top of the substrate can be described in the following terms. If the light transmittance at 550 nm for the article without a film which displays photocatalytic properties (that is, prior to film formation) is termed T1%, and the light transmittance at 550 nm for the article with a film which displays photocatalytic properties (that is, after film formation) is termed T2%, then a characteristic of the present invention is a ratio T2/T1 which is at least 0.9, and preferably at least 0.95. If the T2/T1 ratio is less than 0.9, then the non-transparency for the substrate becomes noticeable.

In contrast, if the substrate is non-transparent, then the transparency of the film formed on top of the substrate can be described in the following manner, using the reflectance.

A spectrophotometer or a spectrophotometric colorimeter is used for measuring the reflectance. The description below focuses on measurements using a CM-3700d spectrophotometric calorimeter manufactured by Minolta Co., Ltd. Using a xenon lamp as the light source, diffuse reflected light from an integrating sphere is irradiated onto a film sample, and of the reflected light from the film, reflected light in a direction forming an angle of 8 degrees relative to the axis perpendicular to the sample surface is captured by a measuring spectrometer. Meanwhile, diffused light from inside the integrating sphere is captured by an illuminating light spectrometer, and each light sample is dispersed into a spectrum, and the reflectance is measured at each wavelength.

If the light reflectance at 550 nm for the article prior to formation of a film which displays photocatalytic properties is termed R1%, and the light reflectance at 550 nm for the article with a film which displays photocatalytic properties is termed R2%, then a characteristic of the present invention is a ratio R2/R1 which is at least 0.9, and preferably at least 0.95. If the R2/R1 ratio is less than 0.9, then concealment and non-transparency for the substrate become noticeable.

Furthermore another characteristic of the present invention is a film which displays photocatalytic properties with a pencil hardness of at least 2H. A film with a high pencil hardness means the film is more resistant to scratches and marking. If a Zr compound is used as the binder then a particularly strong film can be obtained with relative ease. There are no particular restrictions on the substrate (article), and both inorganic substrates and organic substrates are possible. Examples of inorganic substrates include Si compounds, Al compounds, various ceramics and metals. Specific examples include silica, alumina, mullite, spinel, zirconia, titania, graphite, carbon nanotube, diamond, iron, stainless steel, titanium, zircon, niobium and tantalum and the like. Examples of suitable organic substrates include organic polymers. Specifically, a polymer can be selected from a group comprising polyethylene, polypropylene, polystyrene, nylon 6, nylon 66, aramid, polyethylene terephthalate, unsaturated polyester, polyvinyl chloride, polyvinylidene chloride, polyethylene oxide, polyethylene glycol, silicon resin, polyvinyl alcohol, vinyl acetal resin, polyacetate, ABS resin, epoxy resin, vinyl acetate resin, cellulose, rayon and other cellulose derivatives, urethane resin, polyurethane, urea resin, fluororesin, polyvinylidene fluoride, phenol resin, celluloid, chitin, starch sheet, acrylic resin, melamine resin and alkyd resin.

In addition, articles prepared from an aforementioned organic polymer composition via a master batch or a compound state, or articles with a film which displays photocatalytic properties, prepared via an aforementioned coating agent, formed on the surface thereof, can also display hydrophilicity. In order to achieve photocatalyst particles which exhibit effective hydrophilicity, it is recommended that titanium dioxide synthesized by a liquid phase method be used as the raw material. Specific examples of recommended photocatalyst particles include those produced by the surface treatment, with a salt of a polybasic acid, of particles generated by thermal hydrolysis or neutral hydrolysis of an aqueous solution of $TiCl_4$ or an aqueous solution of titanyl sulfate. The contact angle with respect to water can be used as an indicator of the hydrophilicity. A method of measuring the contact angle with respect to water is described below.

A droplet of pure water is transferred onto the film, and the contact angle between the film surface and the liquid droplet is measured. This measurement is performed using a CA-D contact angle meter manufactured by Kyowa Interface Science Co., Ltd. Using the syringe on the apparatus, a pure water droplet equivalent to 20 graduations on the syringe (diameter 1.5) is transferred gently to the film surface, and using an angle plate and a moveable reticule within an optical mirror, the peak of the liquid droplet is determined diagrammatically, the angle between the line connecting the peak and the edge point of the liquid droplet and the film surface is read off directly, and that angle is doubled to determine the contact angle.

In the present invention, hydrophilicity of a film which displays photocatalytic activity describes a film for which, after 24 hours irradiation with light from a day white fluorescent lamp producing an ultraviolet light intensity of 6 $\mu W/cm^2$ at a wavelength of 365 nm, the contact angle with respect to water (hereafter, may be abbreviated as CL) is no more than 20°, and preferably no more than 10°, and even more preferably no more than 5°.

Furthermore, excellent effects can also be achieved for the maintenance of the hydrophilicity when a film is placed in the dark after irradiation with light. Specifically, after 24 hours irradiation with light from a day white fluorescent lamp producing an ultraviolet light intensity of 6 $\mu W/cm^2$ at a wavelength of 365 nm, and subsequent storage for 24 hours in the dark, a film which displays photocatalytic properties according to the present invention displays a contact angle with respect to water (hereafter, this contact angle may be abbreviated as CD) of no more than 20°, and preferably no more than 10°, and even more preferably no more than 5°.

In this manner, by imparting hydrophilicity to the film surface, adhered dirt on the surface can be easily removed, and the clean surface can be maintained over a long period of time, and can be readily restored if required.

In addition, a film which displays photocatalyst properties according to the present invention can also display good weather resistance. Specifically, when a film which displays photocatalytic properties is subjected to a xenon arc lamp accelerated exposure test (using a SUNSHINE XENON LONG LIFE WEATHER METER, manufactured by Suga Test Instruments Co., Ltd., BP temperature: 63±3° C., rainfall: 12/60 minutes), then, even after 4000 hours, films can be produced for which the contact angle with respect to water following 24 hours irradiation with light from a day white fluorescent lamp producing an ultraviolet light intensity of 6 $\mu w/cm^2$ at a wavelength of 365 nm is no more than 20°, and the degree of yellowing is no more than 10.

There are no particular restrictions on the types of articles to which the photocatalytic properties and hydrophilicity described above can be imparted, and suitable examples include building materials, machinery, vehicles, glass products, electric appliances, agricultural materials, electronic equipment, tools, eating utensils, bath goods, toilet goods, furniture, clothing, fabric products, fibers, leather goods, paper products, sports goods, bedding, containers, spectacles, signboards, piping, wiring, brackets, hygiene materials and automobile goods. Furthermore, the invention can also be applied to environmental cleaning equipment and devices effective for treating sick house syndrome, decomposing organochlorine compounds such as PCBs or dioxin found in water, the atmosphere or in soil, and decomposing residual agricultural chemicals or environmental hormones in water or soil.

Furthermore, examples of suitable light sources for effectively generating photocatalytic properties or hydrophilicity within the above type of articles include the sun, fluorescent lamps, incandescent lamps, mercury lamps, xenon lamps, halogen lamps, mercury xenon lamps, metal halide lamps, light emitting diodes, lasers, and the combustion flames from organic material. Furthermore, specific examples of fluorescent lamps include white fluorescent lamps, day white fluorescent lamps, daylight fluorescent lamps, warm white fluorescent lamps, incandescent-lamp-colored fluorescent lamps and black lights.

EXAMPLES

A description of specific features of the present invention, based on a series of examples, follows, although the present invention is in no way restricted to the examples presented here.

Example 1

50 liters (hereafter, "liters" is abbreviated as "L") of pure water was measured, placed in a vessel and heated with stirring until the temperature reached a steady 98° C. 3.6 kg of an aqueous solution of titanium tetrachloride with a Ti concentration of 15 mass % (manufactured by Sumitomo Titanium Corporation) was then added dropwise to the water over a period of 120 minutes. The white colored suspension obtained on completion of the dropwise addition was then subjected to dechlorination in an electrodialysis device, producing a slurry of pH 4. A sample was taken from the thus formed photocatalyst slurry, and measurement of the solid fraction concentration by drying to a constant weight revealed a value of 2 mass %. Structural analysis of the dried powder using an X-ray diffraction apparatus revealed that the product powder was a brookite titanium dioxide. The brookite content was 89 mass % and the anatase content was 11 mass %. The DWA value for the powder was 11%.

Next, 100 g of sodium pyrophosphate (a food additive, manufactured by Taihei Chemical Industrial Co., Ltd.) was dissolved in pure water, forming 2 kg of a 5 mass aqueous solution of sodium pyrophosphate.

50 L of the 2 mass % titanium dioxide slurry obtained above was placed in a reaction vessel and stirred well while cooling. 2 kg of the 5 mass % aqueous solution of sodium pyrophosphate and a 10 mass % aqueous solution of caustic soda were added to the slurry over a period of one hour, to produce a mixed slurry with a pH within a range from 8 to 9. During the addition, the reaction temperature was maintained within a range from 20 to 25° C.

The thus produced pyrophosphate containing titanium dioxide slurry was stored for 1 hour at a temperature of 22 to 28° C. The electric conductivity at this point was 10,000 µS/cm. Next, the slurry was filtered and cleaned using a rotary filter press (manufactured by Kotobuki Engineering and Manufacturing Co., Ltd.), was then washed well with water until the electric conductivity of the filtrate reached 50 µS/cm, and subsequently concentrated to produce a photocatalytic slurry. Measurement of the pH of the thus obtained photocatalytic slurry (using a D-22 device manufactured by Horiba Ltd.) revealed a value of 7.8.

Figure 3:
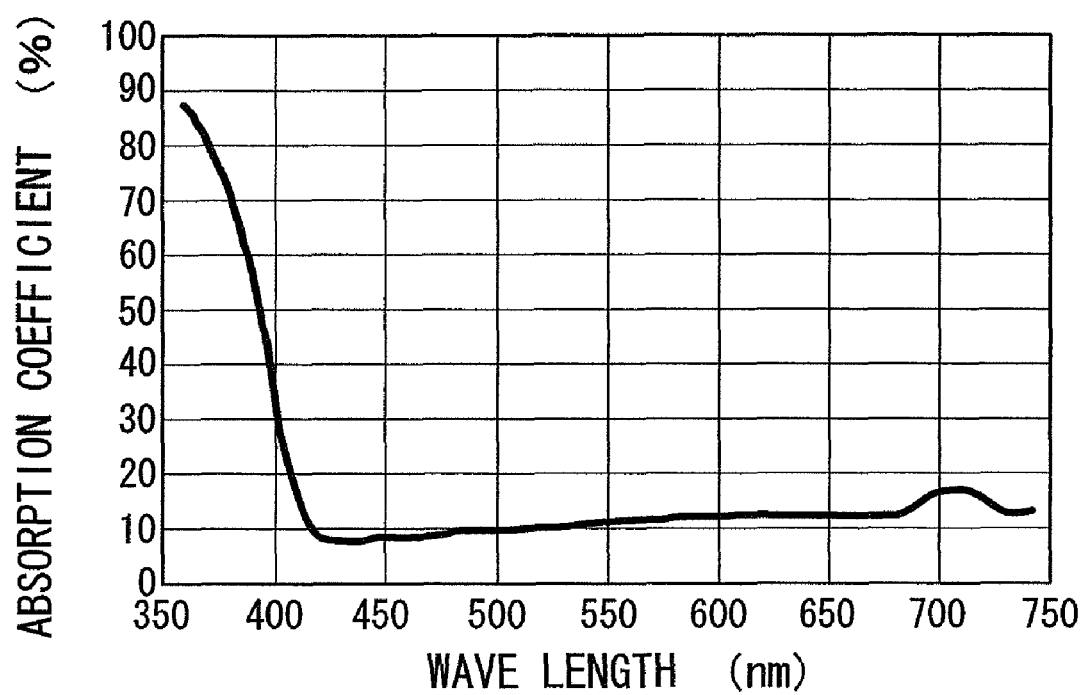
FIG. 3 is an absorption spectrum for a photocatalytic slurry of an example 1.

Next, a sample of the slurry was taken and dried to a constant weight at 120° C. to produce a powder. Calculation of the solid fraction concentration of the slurry based on the quantity of powder revealed a value of 10 mass %. Furthermore, the transmittance at 550 nm of a slurry sample of thickness 2 mm was 46%, and the slurry displayed excellent dispersibility. In addition, the absorption coefficient of a slurry sample of thickness 2 mm was 32% at 400 nm, and was 11% at 550 nm. The absorption coefficient spectrum is shown in FIG. 3. Analysis of the powder produced above using FT-IR (an FT-IR1650 apparatus, manufactured by PerkinElmer Inc.) revealed pyrophosphate absorption. Next, analysis of the dried powder by ICP (using an ICPS-100V device, manufactured by Shimadzu Corporation) revealed the existence of 0.7 mass % of Na and 1.2 mass % of phosphorus. When the zeta potential was measured via an electrophoresis light scattering method using a ELS-8000 device, manufactured by Otsuka Electronics Co., Ltd., the isoelectric point was 2.1. Measurement of the BET specific surface area (using a Flow Sorb II 2300 apparatus, manufactured by Shimadzu Corporation) produced a result of 140 $m^2/g$. Furthermore, the DWA value of the powder was 83%. This value is greater than the DWA value of the raw material titanium dioxide, indicating that the surface treated product offers a higher level of photocatalytic activity.

(Preparation of a High Density Polyethylene Master Batch)

A portion of a photocatalytic slurry prepared in the same manner as described above was dried using a media fluidized drying apparatus (a SLURRY DRYER, manufactured by Okawara Manufacturing Co., Ltd.), yielding 5 kg of a photocatalytic powder comprising fine particles of titanium dioxide with a condensed phosphate formed on the surface thereof. 20 parts by mass of this photocatalytic powder, 2 parts by mass of zinc stearate (ZINC STEARATE S, manufactured by NOF Corporation), and 78 parts by mass of a high density polyethylene (J-REX F6200FD, manufactured by Japan Polyolefins Co., Ltd.) were subjected to melt kneading at 170° C. (residence time of approximately 3 minutes) using a twin-screw extruder (PCM30 apparatus, manufactured by Ikegai Co., Ltd.), and pelletized, yielding 20 kg of columnar compound type pellets of a high density polyethylene containing 20 mass % of photocatalytic powder, with dimensions including a diameter of 2 to 3 mm, a length of 3 to 5 mm and a weight of 0.01 to 0.02 g.

(Fiber Formation)

110 kg of the photocatalytic powder containing high density polyethylene compound produced above and 10 kg of high density polyethylene (J-Rex F6200FD, manufactured by Japan Polyolefins Co., Ltd.) were mixed together for 10 minutes in a V-type mixer (a RKI-40 apparatus, manufactured by Ikemoto Scientific Technology Co., Ltd.) to form mixed pellets. Subsequently, the thus obtained mixed pellets and polyester resin pellets (FM-OK, manufactured by Teijin Ltd.) were each input into a melt extrusion fiber forming apparatus (a POLYMERMAID 5, manufactured by Chubu Kagakukikai Seisakusyo Co., Ltd.), and at a fiber formation packing temperature of 300° C., 35 kg of a core/sheath structured fiber with a thickness of 12 denier formed from a 1:1 mass ratio of photocatalytic powder containing high density polyethylene (sheath) and polyester (core) was produced.

(Evaluation of Photocatalytic Activity)

Next, 10 g of this fiber was placed in a 5 L Tedlar Bag (manufactured by GasTech Corporation) and 60 ppm by volume of hydrogen sulfide was introduced into the bag. Subsequently, the bag was irradiated with light with an ultraviolet light intensity of 6 $\mu W/cm^2$ at a wavelength of 365 nm, using a day white fluorescent lamp (HI-WHITE FL20SS-N/18-B, manufactured by Hitachi GE Lighting Co., Ltd), and after 6 hours of irradiation, the concentration of hydrogen sulfide was measured with a detector tube (No. 4LL, manufactured by GasTech Corporation). The concentration of hydrogen sulfide after 6 hours irradiation was almost undetectable.

(Weather Resistance Test)

The fiber described above was irradiated with 50 mW/cm$^2$ light using a fade meter (SUN TEST CPS+, manufactured by Atlas Corporation), and after 24 hours irradiation the fiber was checked for coloring, but no coloring was visible.

(Preparation 1 of a Coating Agent)

Next, the photocatalytic slurry described above was diluted by adding pure water until the equivalent powder concentration was 0.5 mass %. A water dispersed urethane resin (VONDIC 1040NS, manufactured by Dainippon Ink and Chemicals, Inc.) was then added to the slurry in sufficient quantity to produce a 70% ratio of the urethane resin relative to the powder within the slurry, thereby yielding a coating agent containing a photocatalytic powder and a urethane resin. The pH of the coating agent was 7.1.

Subsequently, a polyester non-woven fabric (6 denier, manufactured by Takayasu Co., Ltd.) was immersed in the above coating agent, and after removal from the agent, was squeezed with a roller to remove excess agent and then dried for 2 hours at 80° C. to yield a polyester non-woven fabric with a photocatalytic powder supported thereon.

(Evaluation of Photocatalytic Activity)

Next, 10 g of this polyester non-woven fabric was placed in a 5 L Tedlar Bag, and 60 ppm by volume of hydrogen sulfide was introduced into the bag. Subsequently, the bag was irradiated with light with an ultraviolet light intensity of 6 $\mu W/cm^2$ at a wavelength of 365 nm, using a day white fluorescent lamp, and after 6 hours of irradiation, the concentration of hydrogen sulfide was measured with a detector tube (No. 4LL, manufactured by GasTech Corporation). The concentration of hydrogen sulfide after 6 hours irradiation was almost undetectable.

(Weather Resistance Test)

The polyester non-woven fabric described above was irradiated with 50 mW/cm$^2$ light using a fade meter (SUN TEST CPS+, manufactured by Atlas Corporation), and after 24 hours irradiation the fabric was checked for coloring, but no coloring was visible.

(Preparation 2 of a Coating Agent)

A zirconium ammonium carbonate solution (containing 20 mass % as $ZrO_2$, manufactured by Nippon Light Metal Co., Ltd.) and pure water were added to the photocatalytic slurry described above, thereby yielding a coating agent. The coating agent comprised 1.5 mass % of photocatalytic powder, and the ratio of $ZrO_2$/photocatalytic powder (mass ratio) was 20%. The pH of the coating agent was 8.2.

Next, a transparent noise-barrier insulation wall formed from an acrylic resin board of thickness 15 mm was subjected to hard coat treatment with TOSGUARD 510 manufactured by GE Toshiba Silicones Co., Ltd., yielding a transparent hard coat treated resin board. Measurement of the total light transmittance using a haze meter TC-III manufactured by Tokyo Denshoku Co., Ltd., revealed a result of 86%. The above coating agent was applied to the transparent resin board using a bar coating method, yielding a transparent noise-barrier wall provided with a photocatalytic film on the surface. The DWH value for the board was 37%, the thickness of the photocatalytic film was 0.3 µm, the total light transmittance of the photocatalytic film covered transparent acrylic board was 86%, T2/T1 was 0.97, and the pencil hardness was 4H. Furthermore, measurement of the contact angles with respect to water revealed values of 2° for CL and 5° for CD. An accelerated exposure test was also conducted using a SUNSHINE XENON LONG LIFE WEATHER METER, manufactured by Suga Test Instruments Co., Ltd., using a BP temperature of 63±3° C., and rainfall of 12/60 minutes. Even after 4000 hours exposure, the contact angle with respect to water following 24 hours irradiation with light from a day white fluorescent lamp producing an ultraviolet light intensity of 6 $\mu W/cm^2$ at a wavelength of 365 nm was 8°, and the degree of yellowing was 6.

Example 2

With the exception of replacing the 100 g of sodium pyrophosphate (a food additive, manufactured by Taihei Chemical Industrial Co., Ltd.) from the example 1 with 100 g of sodium tripolyphosphate (a food additive, manufactured by Taihei Chemical Industrial Co., Ltd.), a photocatalyst slurry was prepared in the same manner as the example 1.

Measurement of the pH of the thus obtained photocatalytic slurry revealed a pH value of 7.7. Furthermore, when the zeta potential was measured via an electrophoresis light scattering method using a ELS-8000 device, manufactured by Otsuka Electronics Co., Ltd., the isoelectric point was 2.0.

Next, a sample of the slurry was taken and dried to a constant weight at 120° C. in order to measure the solid fraction concentration of the slurry, and revealed a value of 10 mass %. Furthermore, the transmittance at 550 nm of a slurry sample of thickness 2 mm was 48%, and the slurry displayed excellent dispersibility. Analysis of the powder produced above using FT-IR revealed tripolyphosphate absorption. Next, analysis of the dried powder by ICP revealed the existence of 0.8 mass % of Na and 1.1 mass % of phosphorus. Measurement of the BET specific surface area produced a result of 140 m$^2$/g. Furthermore, the DWA value of the powder was 61%. This value is greater than the DWA value of the raw material titanium dioxide, indicating that the surface treated product offers a higher level of photocatalytic activity.

Example 3

With the exception of replacing the 100 g of sodium pyrophosphate (a food additive, manufactured by Taihei Chemical Industrial Co., Ltd.) from the example 1 with 100 g of sodium tetrapolyphosphate (a food additive, manufactured by Taihei Chemical Industrial Co., Ltd.), a photocatalyst slurry was prepared in the same manner as the example 1. Measurement of the pH of the thus obtained photocatalytic slurry revealed a pH value of 7.7. Furthermore, when the zeta potential was measured via an electrophoresis light scattering method using a ELS-8000 device, manufactured by Otsuka Electronics Co., Ltd., the isoelectric point was 1.9.

Next, a sample of the slurry was taken and dried to a constant weight at 120° C. in order to measure the solid fraction concentration of the slurry, and revealed a value of 10 mass %. Furthermore, the transmittance at 550 nm of a slurry sample of thickness 2 mm was 36%, and the slurry displayed excellent dispersibility. Analysis of the powder produced above using FT-IR revealed tetrapolyphosphate absorption. Next, analysis of the dried powder by ICP revealed the existence of 0.8 mass % of Na and 0.9 mass % of phosphorus. Measurement of the BET specific surface area produced a result of 141 m$^2$/g. Furthermore, the DWA value of the powder was 55%. This value is greater than the DWA value of the raw material titanium dioxide, indicating that the surface treated product offers a higher level of photocatalytic activity.

Example 4

50 liters (hereafter, "liters" is abbreviated as "L") of pure water was measured, placed in a vessel and heated with stirring until the temperature reached a steady 98° C. 3.6 kg of an aqueous solution of titanium tetrachloride with a Ti concentration of 15 mass % (manufactured by Sumitomo Titanium Corporation) was then added dropwise to the water over a period of 120 minutes. The white colored suspension obtained on completion of the dropwise addition was then subjected to dechlorination in an electrodialysis device, producing a slurry of pH 4. A sample was taken from the thus formed photocatalyst slurry, and measurement of the solid fraction concentration by drying to a constant weight revealed a value of 2 mass %. Structural analysis of the dried powder using an X-ray diffraction apparatus revealed that the product powder was a brookite titanium dioxide. The brookite content was 89 mass % and the anatase content was 11 mass %. The DWA value for the powder was 11%.

Next, 100 g of sodium pyrophosphate (a food additive, manufactured by Taihei Chemical Industrial Co., Ltd.) was dissolved in pure water, forming 2 kg of a 5 mass % aqueous solution of sodium pyrophosphate.

In addition, 100 g of calcium chloride (a food additive, manufactured by Tokuyama Corporation) was also dissolved in pure water, forming 2 kg of a 5 mass % aqueous solution of calcium chloride.

50 L of the 2 mass % titanium dioxide slurry obtained above was placed in a reaction vessel and stirred well with cooling. 2 kg of the 5 mass % aqueous solution of sodium pyrophosphate, 2 kg of the 5 mass % aqueous solution of calcium chloride, and a 10 mass % aqueous solution of caustic soda were added to the slurry over a period of one hour, to produce a mixed slurry with a pH within a range from 8 to 9. During the addition, the reaction temperature was maintained within a range from 20 to 25° C.

The thus produced pyrophosphate containing titanium dioxide slurry was stored for 1 hour at a temperature of 22 to 28° C. The electric conductivity at this point was 9,500 µS/cm. Next, the slurry was filtered and cleaned using a rotary filter press (manufactured by Kotobuki Engineering and Manufacturing Co., Ltd.), was then washed well with water until the electric conductivity of the filtrate reached 47 µS/cm, and subsequently concentrated to produce a photocatalytic slurry. Measurement of the pH of the thus obtained photocatalytic slurry revealed a value of 7.8. Furthermore, when the zeta potential was measured via an electrophoresis light scattering method using a ELS-8000 device, manufactured by Otsuka Electronics Co., Ltd., the isoelectric point was 1.8.

Next, a sample of the slurry was taken and dried to a constant weight at 120° C. in order to measure the solid fraction concentration of the slurry, and revealed a value of 10 mass %. Furthermore, the transmittance at 550 nm of a slurry sample of thickness 2 mm was 42%, and the slurry displayed excellent dispersibility. Analysis of the powder produced above using FT-IR revealed pyrophosphate absorption. Next, analysis of the dried powder by ICP revealed the existence of 0.5 mass % of Ca and 1.3 mass % of phosphorus. Measurement of the BET specific surface area produced a result of 140 m$^2$/g. Furthermore, the DWA value of the powder was 55%. This value is greater than the DWA value of the raw material titanium dioxide, indicating that the surface treated product offers a higher level of photocatalytic activity.

Example 5

With the exception of replacing the 2 kg of the 5 mass % aqueous solution of calcium chloride from the example 4, formed by dissolving 100 g of calcium chloride (a food additive, manufactured by Tokuyama Corporation) in pure water, with 10 kg of a 5 mass % aqueous solution of aluminum chloride formed by dissolving 500 g of aluminum chloride hexahydrate (guaranteed reagent, manufactured by Kanto Kagaku Co., Ltd.) in pure water, a photocatalyst slurry was prepared in the same manner as the example 4. Measurement of the pH of the thus obtained photocatalytic slurry revealed a pH value of 6.9. Furthermore, when the zeta potential was measured via an electrophoresis light scattering method using a ELS-8000 device, manufactured by Otsuka Electronics Co., Ltd., the isoelectric point was 2.0.

Next, a sample of the slurry was taken and dried to a constant weight at 120° C. in order to measure the solid fraction concentration of the slurry, and revealed a value of 10 mass %. Furthermore, the transmittance at 550 nm of a slurry sample of thickness 2 mm was 36%, and the slurry displayed excellent dispersibility. Analysis of the powder produced above using FT-IR revealed pyrophosphate absorption. Next, analysis of the dried powder by ICP revealed the existence of 0.3 mass % of Al and 0.8 mass % of P. Measurement of the BET specific surface area produced a result of 140 m$^2$/g. Furthermore, the DWA value of the powder was 49%. This value is greater than the DWA value of the raw material titanium dioxide, indicating that the surface treated product offers a higher level of photocatalytic activity.

Example 6

Figure 2:
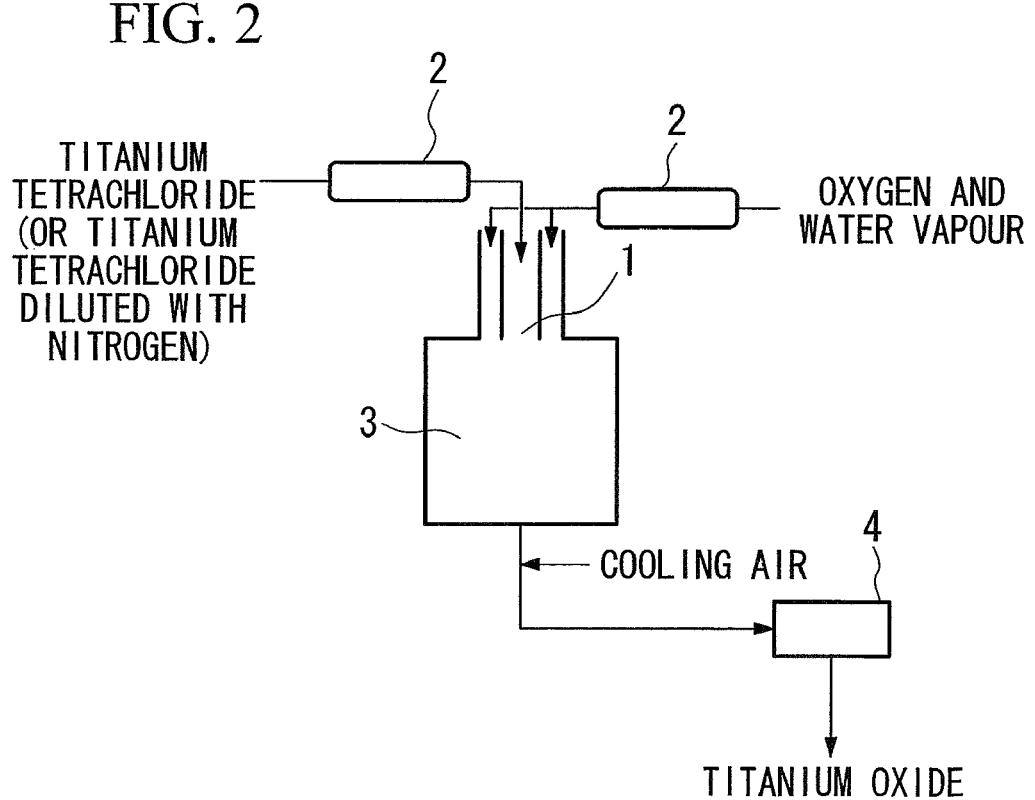
FIG. 2 is a schematic illustration of a reaction device for an example 6.

Dilute titanium tetrachloride gas produced by diluting 8.3 Nm$^3$/hr of gaseous titanium tetrachloride with 6 Nm$^3$/hr of nitrogen gas was preheated to 1,100° C., while a mixed oxidizing gas formed from 4 Nm$^3$/hr of oxygen and 15 Nm$^3$/hr of water vapor was preheated to 1,000° C. Using a reaction apparatus shown in FIG. 2, these two raw material gases were introduced into a quartz glass reaction vessel through a coaxial parallel flow nozzle at flow velocities of 35 m/s and 50 m/s respectively. Following the introduction of cooling air into the reaction vessel to limit the high temperature residence time, at a temperature exceeding 700° C., to 0.2 seconds, the product titanium dioxide powder was collected using a tetrafluoroethylene bag filter. This powder was then heat treated at 350° C. for one hour. The thus obtained titanium dioxide had a BET specific surface area of 54 m$^2$/g, a rutile content of 33 mass %, and an anatase content of 67 mass %. The DWA value for the powder was 18%.

Next, 50 L of a 2 mass % water based slurry containing 900 g of the above powder was prepared, and exhibited a pH of 2.3. This slurry was subjected to demineralization using a negative ion exchange resin, which altered the pH to 3.7.

Next, 100 g of sodium pyrophosphate (a food additive, manufactured by Taihei Chemical Industrial Co., Ltd.) was dissolved in pure water, forming 2 kg of a 5 mass % aqueous solution of sodium pyrophosphate.

In addition, 100 g of calcium chloride (a food additive, manufactured by Tokuyama Corporation) was also dissolved in pure water, forming 2 kg of a 5 mass % aqueous solution of calcium chloride.

50 L of the 2 mass % titanium dioxide slurry obtained above was placed in a reaction vessel and stirred well while cooling. 2 kg of the 5 mass % aqueous solution of sodium pyrophosphate, 2 kg of the 5 mass % aqueous solution of calcium chloride, and a 10 mass % aqueous solution of caustic soda were added to the slurry over a period of one hour, to produce a mixed slurry with a pH within a range from 8 to 9. During the addition, the reaction temperature was maintained within a range from 20 to 25° C.

The thus produced pyrophosphate containing titanium dioxide slurry was stored for 1 hour at a temperature of 22 to 28° C. The electric conductivity at this point was 9,400 µS/cm. Next, the slurry was filtered and cleaned using a rotary filter press (manufactured by Kotobuki Engineering and Manufacturing Co., Ltd.), was then washed well with water until the electric conductivity of the filtrate reached 40 µS/cm, and subsequently concentrated to produce a photocatalytic slurry.

Measurement of the pH of the thus obtained photocatalytic slurry (using a D-22 device manufactured by Horiba Ltd.) revealed a value of 7.8. Furthermore, when the zeta potential was measured via an electrophoresis light scattering method using a ELS-8000 device, manufactured by Otsuka Electronics Co., Ltd., the isoelectric point was 2.3.

Next, a sample of the slurry was taken and dried to a constant weight at 120° C. in order to measure the solid fraction concentration of the slurry, and revealed a value of 10 mass %. Furthermore, the transmittance at 550 nm of a slurry sample of thickness 2 mm was 8%. Analysis of the dried powder by ICP (using an ICPS-100V device, manufactured by Shimadzu Corporation) revealed the existence of 0.2 mass % of Na and 0.3 mass % of phosphorus. Measurement of the BET specific surface area produced a result of 58 m²/g. Furthermore, the DWA value of the powder was 62%. This value is greater than the DWA value of the raw material titanium dioxide, indicating that the surface treated product offers a higher level of photocatalytic activity.

Comparative Example 1

In a similar manner to the example 1, 50 L of pure water was measured, placed in a vessel and heated with stirring until the temperature reached a steady 98° C. 3.6 kg of an aqueous solution of titanium tetrachloride with a Ti concentration of 15 mass % was then added dropwise to the water over a period of 120 minutes. The white colored suspension obtained on completion of the dropwise addition was then concentrated under reduced pressure at 40° C., and then subjected to dechlorination in an electrodialysis device, producing a slurry of pH 4. When the zeta potential was measured via an electrophoresis light scattering method using a ELS-8000 device, manufactured by Otsuka Electronics Co., Ltd., the isoelectric point was 4.5. A sample was taken from the thus formed photocatalytic slurry, and measurement of the solid fraction concentration by drying to a constant weight revealed a value of 10 mass %. Structural analysis of the dried powder using an X-ray diffraction apparatus revealed that the product powder was a brookite titanium dioxide. The brookite content was 89 mass % and the anatase content was 11 mass %. Measurement of the BET specific surface area produced a result of 140 m²/g. The transmittance at 550 nm of a slurry sample of thickness 2 mm was 44%. Furthermore, the DWA value for the powder was 11%.

(Preparation of a High Density Polyethylene Master Batch)

A portion of a photocatalytic slurry prepared in the same manner as described above was dried using a media fluidized drying apparatus (a SLURRY DRYER, manufactured by Okawara Manufacturing Co., Ltd.), yielding 5 kg of a photocatalytic powder. 20 parts by mass of this photocatalytic powder, 2 parts by mass of zinc stearate (ZINC STEARATE S, manufactured by NOF Corporation), and 78 parts by mass of a high density polyethylene (J-Rex F6200FD, manufactured by Japan Polyolefins Co., Ltd.) were subjected to melt kneading at 170° C. (residence time of approximately 3 minutes) using a twin-screw extruder (PCM30 apparatus, manufactured by Ikegai Co., Ltd.), and pelletized, yielding 20 kg of columnar compound type pellets of a high density polyethylene containing 20 mass % of photocatalytic powder, with dimensions including a diameter of 2 to 3 mm, a length of 3 to 5 mm and a weight of 0.01 to 0.02 g.

(Fiber Formation)

10 kg of the photocatalytic powder containing high density polyethylene compound produced above and 10 kg of high density polyethylene (J-REX F6200FD, manufactured by Japan Polyolefins Co., Ltd.) were mixed together for 10 minutes in a V-type mixer (a RKI-40 apparatus, manufactured by Ikemoto Scientific Technology Co., Ltd.) to form mixed pellets.

Subsequently, the thus obtained mixed pellets and polyester resin pellets (FM-OK, manufactured by Teijin Ltd.) were each input into a melt extrusion fiber forming apparatus (a POLYMERMAID 5, manufactured by Chubu Kagakukikai Seisakusyo Co., Ltd.), and at a fiber formation packing temperature of 300° C., 35 kg of a core/sheath structured fiber with a thickness of 12 denier formed from a 1:1 mass ratio of photocatalytic powder-containing high density polyethylene (sheath) and polyester resin (core) was produced.

(Evaluation of Photocatalytic Activity)

Next, 10 g of this resin was placed in a 5 L Tedlar Bag (manufactured by GasTech Corporation) and 60 ppm by volume of hydrogen sulfide was introduced into the bag. Subsequently, the bag was irradiated with light with an ultraviolet light intensity of 6 µW/cm² at a wavelength of 365 nm, using a day white fluorescent lamp (HI-WHITE FL20SS-N/18-B, manufactured by Hitachi GE Lighting Co., Ltd), and after 6 hours of irradiation, the concentration of hydrogen sulfide was measured with a detector tube (No. 4LL, manufactured by GasTech Corporation). The concentration of hydrogen sulfide after 6 hours of irradiation was 12 ppm by volume. This result was considerably higher than the result observed in the example 1, indicating that the photocatalytic function with a day white fluorescent lamp as the light source was considerably inferior to that of the example 1.

(Weather Resistance Test)

The fiber described above was irradiated with 50 mW/cm² light using a fade meter (SUN TEST CPS+, manufactured by Atlas Corporation), and after 24 hours irradiation the fiber was checked for coloring, and a strong yellow coloring was observed.

Comparative Example 2

50 L of pure water was measured, placed in a vessel and heated while stirring until the temperature reached a steady 98° C. 3.6 kg of an aqueous solution of titanium tetrachloride with a Ti concentration of 15 mass % was then added dropwise to the water over a period of 120 minutes. The pH was 0. A sample was taken from the thus formed photocatalytic slurry, and measurement of the solid fraction concentration by drying to a constant weight revealed a value of 2 mass %. Structural analysis of the dried powder using an X-ray diffraction apparatus revealed that the product powder was a brookite titanium dioxide. The brookite content was 89 mass % and the anatase content was 11 mass %. Furthermore, the DWA value for the powder was 11%.

Next, 100 g of sodium pyrophosphate (a food additive, manufactured by Taihei Chemical Industrial Co., Ltd.) was dissolved in pure water, forming 2 kg of a 5 mass % aqueous solution of sodium pyrophosphate.

50 L of the 2 mass % titanium dioxide slurry obtained above was placed in a reaction vessel and stirred well while cooling. 2 kg of the 5 mass % aqueous solution of sodium pyrophosphate, and a 10 mass % aqueous solution of caustic soda were added to the slurry over a period of one hour, to produce a mixed slurry with a pH within a range from 8 to 9. During the addition, the reaction temperature was maintained within a range from 20 to 25° C.

The thus produced pyrophosphate containing titanium dioxide slurry was stored for 1 hour at a temperature of 22 to 28° C. The electric conductivity at this point was 22,000 µS/cm. Next, the slurry was filtered and cleaned using a rotary filter press (manufactured by Kotobuki Engineering and Manufacturing Co., Ltd.), was then washed well with water until the electric conductivity of the filtrate reached 50 µS/cm, and subsequently concentrated to produce a photocatalytic slurry.

Measurement of the pH of the thus obtained photocatalytic slurry (using a D-22 device manufactured by Horiba Ltd.) revealed a value of 7.8.

Next, a sample of the slurry was taken and dried to a constant weight at 120° C. to produce a powder. Calculation of the solid fraction concentration of the slurry based on the quantity of powder revealed a value of 10 mass %. Furthermore, the transmittance at 550 nm of a slurry sample of thickness 2 mm was 16%. Analysis of the powder produced above using FT-IR (an FT-IR1650 apparatus, manufactured by PerkinElmer Inc.) revealed pyrophosphate absorption. Next, analysis of the dried powder by ICP (using an ICPS-100V device, manufactured by Shimadzu Corporation) revealed the existence of 0.9 mass % of Na and 1.3 mass % of phosphorus. Measurement of the BET specific surface area produced a result of 140 m$^2$/g. Furthermore, the DWA value of the powder was 10%. This value is less than the DWA value of the raw material titanium dioxide.

Comparative Example 3

A test was performed in accordance with the example presented in Japanese Unexamined Patent Application, Laid-open No. Hei 11-278843 A. 50 L of pure water was measured, placed in a vessel and heated while stirring until the temperature reached a steady 98° C. 3.6 kg of an aqueous solution of titanium tetrachloride with a Ti concentration of 15 mass % was then added dropwise to the water over a period of 120 minutes. The pH was 0. A sample was taken from the thus formed photocatalytic slurry, and measurement of the solid fraction concentration by drying to a constant weight revealed a value of 2 mass %. Structural analysis of the dried powder using an X-ray diffraction apparatus revealed that the product powder was a brookite titanium dioxide. The brookite content was 89 mass % and the anatase content was 11 mass %. Furthermore, the DWA value for the powder was 11%.

Next, 100 g of pyrophosphoric acid (guaranteed reagent, manufactured by Kanto Kagaku Co., Ltd.) was dissolved in pure water, forming 2 kg of a 5 mass % aqueous solution of pyrophosphoric acid.

50 L of the 2 mass % titanium dioxide slurry obtained above was placed in a reaction vessel and stirred well while cooling. 2 kg of the 5 mass % aqueous solution of pyrophosphoric acid was added to the slurry. In addition, a 10 mass % aqueous solution of caustic soda was also added over a period of one hour, and yielded a slurry with a pH of 8.2. During the addition, the reaction temperature was maintained within a range from 20 to 25° C.

The thus produced pyrophosphate containing titanium dioxide slurry was stored for 1 hour at a temperature of 22 to 28° C. The electric conductivity at this point was 28,000 µS/cm. Next, the slurry was filtered and cleaned using a rotary filter press (manufactured by Kotobuki Engineering and Manufacturing Co., Ltd.), was then washed well with water until the electric conductivity of the filtrate reached 58 µS/cm, and was subsequently concentrated to produce a photocatalytic slurry.

Measurement of the pH of the thus obtained photocatalytic slurry (using a D-22 device manufactured by Horiba Ltd.) revealed a value of 7.3.

Next, a sample of the slurry was taken and dried to a constant weight at 120° C. to produce a powder. Calculation of the solid fraction concentration of the slurry based on the quantity of the powder revealed a value of 10 mass %. Furthermore, the transmittance at 550 nm of a slurry sample of thickness 2 mm was 15%. Analysis of the powder produced above using FT-IR (an FT-IR1650 apparatus, manufactured by PerkinElmer Inc.) revealed pyrophosphate absorption. Next, analysis of the dried powder by ICP (using an ICPS-100V device, manufactured by Shimadzu Corporation) revealed the existence of 0.9 mass % of Na and 1.3 mass % of phosphorus. Measurement of the BET specific surface area produced a result of 140 m$^2$/g. Furthermore, the DWA value of the powder was 8%. This value is less than the DWA value of the raw material titanium dioxide.

Comparative Example 4

A test was performed in accordance with the example presented in Japanese Unexamined Patent Application, Laid-open No. 2001-72419 A.

100 g of 20% titanium trichloride solution (guaranteed reagent, manufactured by Wako Pure Chemical Industries Ltd.) was placed in a 300 mL flask and stirred under an atmosphere of nitrogen. With the flask cooled in an ice bath, 141 g of 25% ammonia water (guaranteed reagent, manufactured by Wako Pure Chemical Industries Ltd.) was added dropwise over a period of approximately 30 minutes to effect a hydrolysis. The thus obtained sample was filtered, washed and dried. The product was then baked in air at 400° C. for one hour, yielding yellow colored particles of titanium oxide. The crystal structure of the titanium oxide was an anatase structure. The DWA was 18%. This represents a lower activity than the product of the example 1.

Comparative Example 5

In a similar manner to the example 1, 50 L of pure water was measured, placed in a vessel and heated while stirring until the temperature reached a steady 98° C. 3.6 kg of an aqueous solution of titanium tetrachloride with a Ti concentration of 15 mass % (manufactured by Sumitomo Titanium Corporation) was then added dropwise to the water over a period of 120 minutes. The white colored suspension obtained on completion of the dropwise addition was then subjected to dechlorination in an electrodialysis device, producing a slurry of pH 4. A sample was taken from the thus formed photocatalyst slurry, and measurement of the solid fraction concentration by drying to a constant weight revealed a value of 2 mass %. Structural analysis of the dried powder using an X-ray diffraction apparatus revealed that the product powder was a brookite titanium dioxide. The brookite content was 89 mass % and the anatase content was 11 mass %. Furthermore, the DWA value for the powder was 11%.

Next, 100 g of sodium pyrophosphate (powder for a food additive, manufactured by Taihei Chemical Industrial Co., Ltd.) was added to the slurry, dispersed, and then dissolved.

The thus produced pyrophosphate containing titanium dioxide slurry was stored for 1 hour at a temperature of 22 to 28° C. The electric conductivity at this point was 10,000 µS/cm. Next, the slurry was filtered and cleaned using a rotary filter press (manufactured by Kotobuki Engineering and Manufacturing Co., Ltd.), was then washed well with water until the electric conductivity of the filtrate reached 50 µS/cm, and subsequently concentrated to produce a photocatalytic slurry. Measurement of the pH of the thus obtained photocatalytic slurry revealed a value of 7.9.

Next, a sample of the slurry was taken and dried to a constant weight at 120° C. to produce a powder. Calculation of the solid fraction concentration of the slurry based on the quantity of powder revealed a value of 10 mass %. Furthermore, the absorption coefficient of a slurry sample of thickness 2 mm was 21% at 400 nm, and 6% at 550 nm. The absorption coefficient of visible light was lower than that observed in the example 1.

INDUSTRIAL APPLICABILITY

By complexing a compound inactive as a photocatalyst onto the surface of fine particles of titanium dioxide under specific conditions, the present invention provides photocatalyst particles and powder capable of exhibiting good photocatalytic function with a light source of extremely low intensity, as well as an organic polymer composition, a neutral and highly transparent slurry and coating agent, and articles with surfaces which display photocatalytic properties and hydrophilicity, all of which utilize the above photocatalyst particles or powder. Accordingly, the present invention is industrially extremely useful.

What is claimed is:

1. A method of producing composite particles of titanium dioxide and a compound inactive as a photocatalyst, comprising the steps of
   preparing a water based slurry of pH 3 to 5 comprising titanium dioxide,
   preparing a water based solution comprising a compound inactive as a photocatalyst, and
   reacting said slurry and said water based solution together at a pH of 4 to 10.

2. A method of producing composite particles of titanium dioxide and a compound inactive as a photocatalyst according to claim 1, wherein a concentration of titanium dioxide in said water based slurry comprising titanium dioxide is 0.1 to 10 mass %.

3. A method of producing composite particles of titanium dioxide and a compound inactive as a photocatalyst according to claim 1, wherein a concentration of titanium dioxide on mixing of said water based slurry comprising titanium dioxide and said water based solution comprising a compound inactive as a photocatalyst is no more than 5 mass %.

4. A method of producing composite particles of titanium dioxide and a compound inactive as a photocatalyst according to claim 1, wherein a reaction temperature between said water based slurry comprising titanium dioxide and said water based solution comprising a compound inactive as a photocatalyst is no more than 50° C.

5. A method of producing composite particles of titanium dioxide and a compound inactive as a photocatalyst according to claim 1, wherein said step of preparing said water based slurry comprising titanium dioxide includes a process for wet synthesis of titanium dioxide, and does not include a process for producing titanium dioxide powder from said synthesized slurry.

6. A method of producing composite particles of titanium dioxide and a compound inactive as a photocatalyst according to claim 1, wherein said titanium dioxide comprises an anatase crystal form.

7. A method of producing composite particles of titanium dioxide and a compound inactive as a photocatalyst according to claim 1, wherein said titanium dioxide comprises a brookite crystal form.

8. A method of producing composite particles of titanium dioxide and a compound inactive as a photocatalyst according to claim 1, wherein said titanium dioxide comprises a rutile crystal form.

9. A method of producing composite particles of titanium dioxide and a compound inactive as a photocatalyst according to claim 1, wherein said titanium dioxide comprises at least two crystal forms of anatase, rutile and brookite crystal forms.

10. A method of producing composite particles of titanium dioxide and a compound inactive as a photocatalyst according to claim 1, wherein a BET specific surface area of said titanium dioxide is within a range from 10 to 300 $m^2/g$.

11. A method of producing composite particles of titanium dioxide and a compound inactive as a photocatalyst according to claim 1, wherein said compound inactive as a photocatalyst is a salt selected from a group consisting of phosphates, condensed phosphates, borates, sulfates, condensed sulfates and carboxylates.

12. A method of producing composite particles of titanium dioxide and a compound inactive as a photocatalyst according to claim 11, wherein said condensed phosphate is a salt selected from a group consisting of pyrophosphates, tripolyphosphates, tetrapolyphosphates, metaphosphates and ultraphosphates.

13. A method of producing composite particles of titanium dioxide and a compound inactive as a photocatalyst according to claim 1, wherein said compound inactive as a photocatalyst is at least one compound selected from a group consisting of Si compounds, Al compounds, P compounds, S compounds and N compounds.

14. A method of producing composite particles of titanium dioxide and a compound inactive as a photocatalyst according to claim 1, wherein said compound inactive as a photocatalyst comprises at least one metal selected from a group consisting of alkali metals, alkali earth metals, transition metals and Al.

15. A method of producing composite particles of titanium dioxide and a compound inactive as a photocatalyst according to claim 14, wherein said alkali metal is at least one metal selected from a group consisting of Na and K.

16. A method of producing composite particles of titanium dioxide and a compound inactive as a photocatalyst according to claim 14, wherein said alkali earth metal is at least one metal selected from a group consisting of Mg and Ca.

17. A method of producing composite particles of titanium dioxide and a compound inactive as a photocatalyst according to claim 14, wherein said transition metal is at least one metal selected from a group consisting of Fe and Zn.

18. A method of producing composite particles of titanium dioxide and a compound inactive as a photocatalyst in which said titanium dioxide is surface treated with said compound inactive as a photocatalyst, wherein said composite particles display a higher photocatalytic activity than said raw material titanium dioxide.

* * * * *